(12) United States Patent
Vicini et al.

(10) Patent No.: US 12,401,618 B1
(45) Date of Patent: Aug. 26, 2025

(54) INTERNET INFRASTRUCTURE SYSTEM AND METHOD

(71) Applicant: FREENAME AG, Wollerau (CH)

(72) Inventors: Davide Vicini, Wollerau (CH); Federico Costa, Ponte San Nicolò (IT)

(*) Notice: Subject to any disclaimer, the term of this patent is extended or adjusted under 35 U.S.C. 154(b) by 0 days.

(21) Appl. No.: 18/586,079

(22) Filed: Feb. 23, 2024

(51) Int. Cl.
H04L 61/5046 (2022.01)
H04L 61/4511 (2022.01)
H04L 61/4552 (2022.01)

(52) U.S. Cl.
CPC ...... H04L 61/5046 (2022.05); H04L 61/4511 (2022.05); H04L 61/4552 (2022.05)

(58) Field of Classification Search
CPC ............. H04L 61/5046; H04L 61/4511; H04L 61/4552
USPC ........................................................ 709/245
See application file for complete search history.

(56) References Cited

U.S. PATENT DOCUMENTS

| 2018/0211303 | A1* | 7/2018 | Chatwin | G06N 20/00 |
| 2019/0327251 | A1* | 10/2019 | Muddu | H04L 63/20 |
| 2020/0067861 | A1* | 2/2020 | Leddy | G06F 21/6245 |

* cited by examiner

Primary Examiner — Hermon Asres
(74) Attorney, Agent, or Firm — Michael L. Greenberg, Esq.; Greenberg & Lieberman, LLC

(57) ABSTRACT

An internet infrastructure protocol, system, and method configured to synergistically integrate with major existing Blockchains and all web3 or web2 Domain Name Registries. This distinctive feature enables the system to transcend traditional challenges associated with online identity management, offering advanced solutions tailored to the web3 or web2 ecosystem for handling name collision cases, mediation of name collision conflict processes, indexing, DNS administration, web3 or web2 browsing security, DNS lookup/resolution and abuse prevention. Further, the system is the combination of a protocol+a management platform that allows users to interact and customize the behavior of the protocol on a Project and Profile level. The platform instantiates DNS servers on-demand, providing a high level of configuration and compatibility for users, brands, companies, and services.

12 Claims, 24 Drawing Sheets

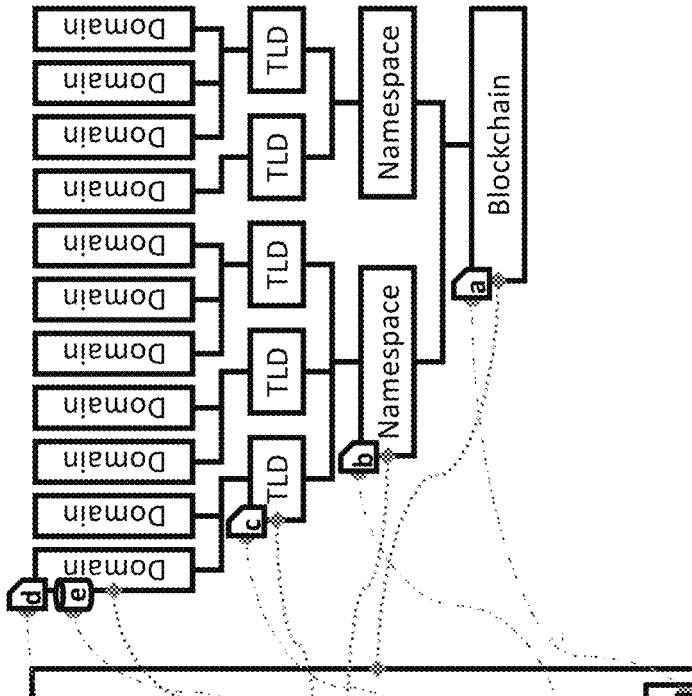
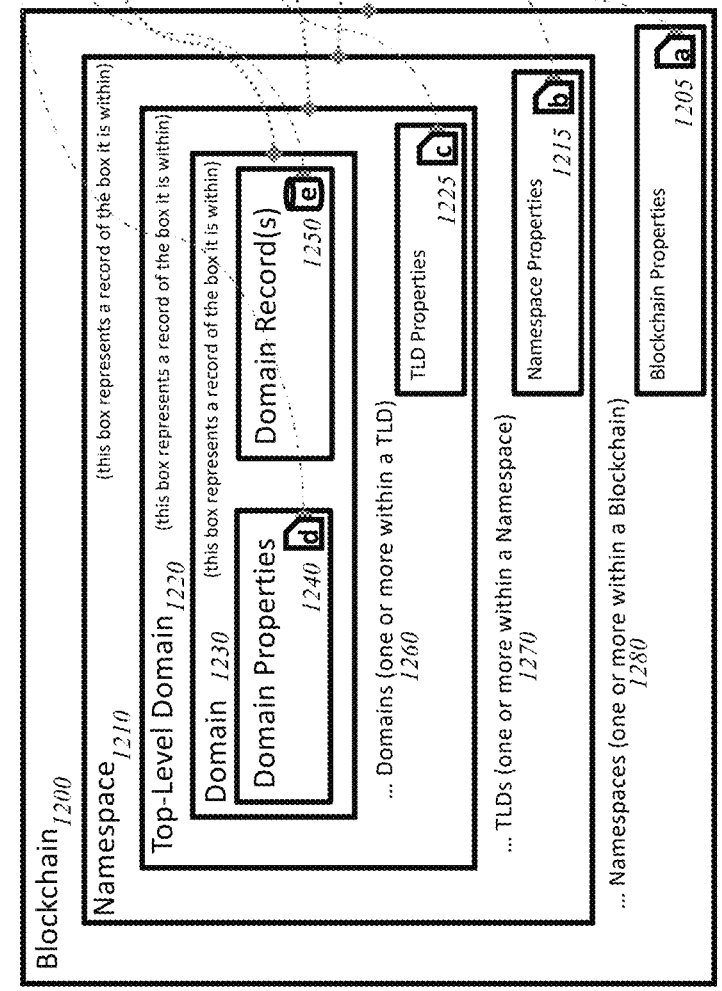
FIG. 12

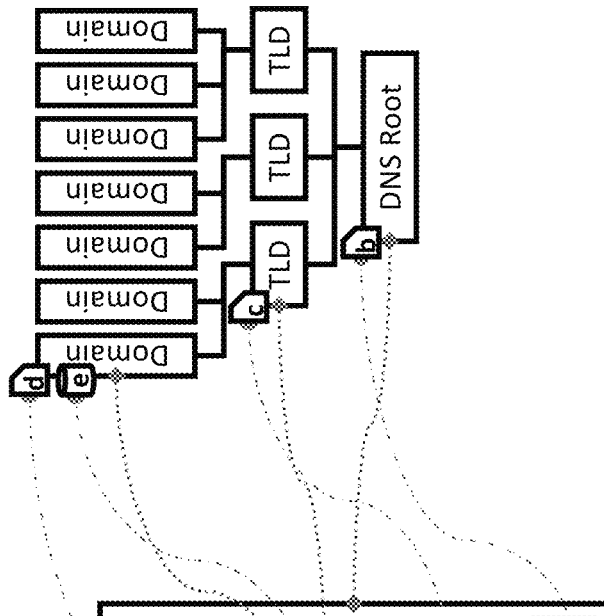
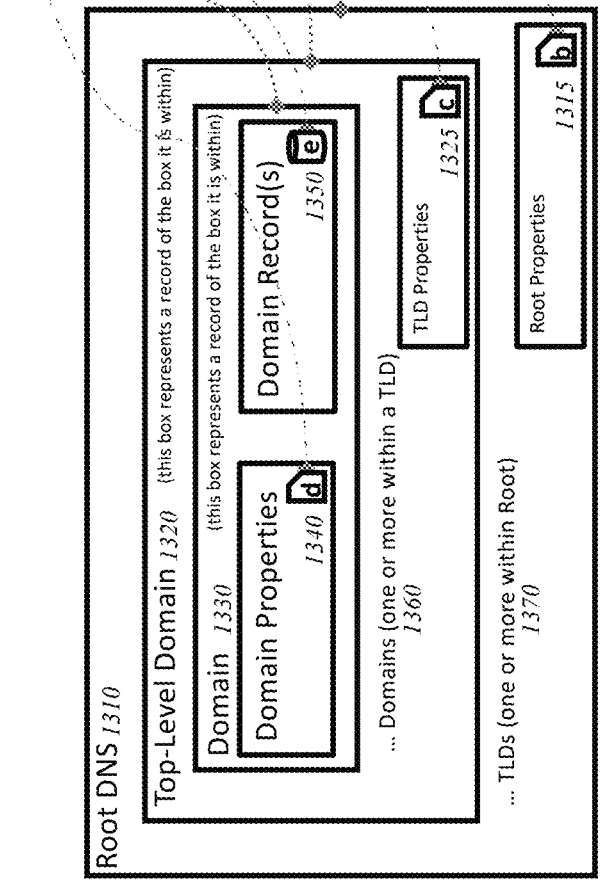
FIG. 13

Domain Property Elements' use in default Rules and Weight Assignments

2000 Domain Name Properties

| Domain Properties | Abbreviation | [A] | [B] |
|---|---|---|---|
| Creation/Minting Date | DCR_DT | 2023-06-10 | 2022-02-08 |
| Qty of DNS Records | numberOfRecords | 10 | 1 |

2010 Top-Level Domain Name Properties

| TLD Properties | Abbreviation | [A] | [B] |
|---|---|---|---|
| Creation/Minting Date | TCR_DT | 2017-03-21 | 2019-05-03 |
| Qty of Unique Records | TLD_UQ | 1000 | 2000 |
| Qty of DNS Records | TQTY_OR | 10000 | 10000 |

2020 Calculated Variable Properties

| Calculated Variable | Abbreviation | Formula |
|---|---|---|
| Today's Date | NOW_DT | NOW |
| Domain Age | DOM_AGE | (NOW_DT − DCR_DT) |
| TLD Unique Ratio | TLD_UT | (TLD_UQ ÷ TQTY_OR) |

2030 Assignment in Weighting and Calculation

| The Rule | Weight Variable | Weight | Formula to Support the Rule |
|---|---|---|---|
| Oldest Registration Date | weightOldest | 1 | (DOM_AGE = MAX( DOM_AGE[A], DOM_AGE[B] ) ) * weightOldest |
| TLD Unique/Total | weightTLD_UT | 0 | TLD_UT * weightTLD_UT |
| Number of Records | weightNOfRecords | 0.1 | numberOfRecords * weightNOfRecords |

FIG. 20

INTERNET INFRASTRUCTURE SYSTEM AND METHOD

FIELD OF THE PRESENT INVENTION

The present invention relates to the field of internet infrastructure, and more specifically relates to a system and protocol for providing domain resolution, domain conflict management, domain indexing, and domain abuse signaling, in the context of decentralized technology in the web3 space. The system and method of the present invention are configured to create and manage a blockchain domain index, derived directly from divergent blockchains, to provide a "source of truth" to domain resolutions, empowering decentralized use of the internet while offering advanced solutions tailored to the web3 ecosystem, including mediation of conflict and handling of domain name collision cases, DNS resolution/lookup processes, indexing, DNS administration, web3 browsing security, and abuse prevention.

BACKGROUND OF THE PRESENT INVENTION

In the use of the traditional internet, domain names have become a fundamental method of accessing resources, and the Domain Name System (DNS) is a standard that was defined in 1987 with RFC1034 and RFC1035, which outlined the concepts and facilities, as well as the implementation and specifications that every connected computer and device uses. For decades, Domain Names are popular and crucial as a technology, as a human-readable and sharable means of accessing resources adds convenience of use when contrasted with instead attempting to remember and typing the IPV4 address of a server (or worse, far more complex IPv6 addresses), as these are strings of numbers that are less memorable or absent context of what the resource may be. The valuable DNS standard was defined through the Internet Engineering Task Force (IETF), and the resource records, Domain Name registration and DNS resolution receive regulatory oversight provided by institutions such as Internet Corporation for Assigned Names and Numbers (ICANN) and Internet Assigned Numbers Authority (IANA) for governance-all have played a pivotal role in ensuring streamlined processes and guaranteeing a secure and stable browsing experience for the conventional internet, often referred to as 'Web2'. However, new innovations, ideas and competition that expand naming and access resources beyond those that DNS traditionally serve (often referred to as 'web3'), the landscape becomes markedly more complex due to the decentralized nature of web3 organizations and technologies. Navigating this decentralized web3 space poses inherent challenges in maintaining the same level of documented standards, ease and security experienced within the traditional 'web2' internet.

In the use of an internet domain name, there are different elements that operate within a hierarchy, separated by the 'dot' (".") character, working backwards from the Top-Level Domain (TLD), second level domain (SLD) and then further, separated by the dot. So, as an example, freename.io would exist underneath the .io TLD, where the SLD is 'freename', and the domain name is 'freename.io'. The io TLD exists in the IANA-operated root DNS that all computers and devices use and recognize, and someone looking for a resource such as the freename.io website would receive standard access by simply typing the domain name into their web browser. That web browser, uses DNS behind the scenes, performs a machine lookup to a resolver, which in turn iterates to other resolvers for answers where available, or going up a level, until it hits the apex answer at the DNS root servers on what to do.

A domain name like freename.io works for all users on all devices as a default configuration because of the presence of .io on the root name servers at the core of the DNS, thus having a means to respond to a known TLD. While domains within TLDs that are listed on the root name servers operate as expected, where a request for a known name is fulfilled in the DNS and receives a response, the DNS is also used for attempting to resolve things in TLDs not known to the root name servers. Such use of non-existing TLDs is generally an experience that is fractured and inconsistent, as devices will get limited to the environment of DNS service of the devices that are under their control.

The way that DNS works, there are existing TLDs, but if you own/manage the DNS for users within your network, it is possible to create your own TLD and privately operate it within the DNS Service used by a given 'audience' for their answers. The reason this is not frequently done is that such a self-invented TLD would only work for a limited number of devices and users within the affected network—the experience for any devices or users that are not using the same DNS Service would be that they would not work, or would not be the same. Additionally, another party could also self-create a TLD of the same name in a different environment, and use that within their own DNS Services that are under their control.

The .CORP TLD, as an example, is NOT in the root system. It was widely used in such a manner for identifying resources and devices within different organizations, where each organization was also in charge of the DNS Services for that org. Two or more different orgs could each be operating their own .CORP and have domain names within, and their specific nameservers could answer requests from within their specific infrastructure—and all of which would all be occurring within their specific, separate environments with minimal issues.

The core DNS infrastructure does not frequently get additional namespaces, but ICANN does occasionally open up application periods every decade or so where an organization might apply for their request to operate a Top-Level Domain. The last open request window in 2012, where ICANN accepted TLD applications received requests for the .CORP TLD to be created. It was determined, when ICANN performed security and stability testing, that the introduction of CORP to the root nameservers caused the behavior of those previously privately configured, self-defined TLDs used by orgs that had to change in unexpected ways in order for their corporate resources to continue to function in an expected manner. This is a phenomenon called 'Name Collision', which we will explain more later within the present invention, but the net effect of Name Collision is where devices might receive inconsistent responses from their upstream DNS nameservers and experience problems. ICANN, in their governing capacity, ultimately defined this Name Collision issue to be a problem for security and stability, and did not let any .CORP TLD application(s) proceed.

Web3 has high innovation, but low governance, and no such safety rails as ICANN provides to the web2 namespace. Many of the innovations that are enabled through access to web3 resources, such as wallets, smart contracts or other materials utilize complex addresses that are long hexadecimal strings. Web3 projects of many varieties have adopted namespace methodology that allows for a similar 'human-compatible' use of resource naming, akin to how domain names work. While some web3 projects have worked within the existing root server TLDs as defined by ICANN, many self-defined one or more TLDs for their namespace to operate within.

These web3 projects perpetuate the potential challenge of self-defined namespace experiencing Name Collision issues akin to that which .CORP presented when new TLDs from ICANN application windows become added to the root nameservers. It is within this complex and evolving environment that solutions are needed to many conventional problems that historically the traditional internet architecture has addressed such as domain name conflicts (and mediation of domain lookup conflicts), domain abuse signals, domain indexing, and DNS administration. Domain name conflicts are even more problematic in the web3 space as a user's cryptocurrency wallet may be embodied in a web3 domain (i.e. alice.bob). As an example, if two users have the same wallet name pointing to a domain, and a fund transfer is initiated, it can be very difficult to verify to which user's wallet the funds should be transmitted. Similar conflict mediations are required with all wallet related activities and web3 domain utilities, including resolving websites exhibiting naming conflicts.

Unfortunately, due to the decentralized nature of the budding web3 internet, these issues remain unaddressed. Namespace conflicts are prone to arise more frequently without adequate indexing systems in place that can incorporate specific conflict mediation rules to address the conflicts. There is not presently a tool that allows for conflicts to be verified, and to provide for the management of mediating these conflicts intentionally.

If there were a system by which the fundamental principles that currently underpin the traditional use of the internet could be extended, and if these principles could be technologically expanded into the internet usage within the Blockchain framework, web3 would have more secure footing to flourish.

Further, unregulated web3 domains present unique challenges given that the conventional DNS-based system cannot be employed to manage domain abuses. In the current ecosystem, web3 domains lack a dedicated DNS Abuse Management framework and tools, leading to a governance void. This absence poses significant challenges as users transition to a new domain landscape fraught with potential threats in an unregulated market.

If there were a system and protocol by which a new form of integrated abuse management mechanisms designed to ingest and interpret DNS Abuse signals originating from established DNS Abuse Management Providers and integrate these signals seamlessly into the existing abuse reporting infrastructure, these capabilities could be expanded to cover web3 domains.

Thus, there is a need for an extension of the sound principles that currently regulate and facilitate the conventional (web2) internet, aiming to adapt and apply these principles, including DNS resolution, domain conflict mediation, domain indexing, and domain abuse signaling, in the context of decentralized technology found in the web3 space. Such a system and method preferably seeks to bridge the gap and extend the ease, safety, and structured operation found within traditional internet usage into the decentralized sphere, addressing the challenges posed by the nature of web3. Further, a resilient system capable of effectively managing the uncertainties and complexities arising from a multitude of web3 Registrars and/or namespaces operating in several different Blockchains is required.

ICANN will be introducing new Top-Level Domains through a process of applicants and reviews, which will net out as expansion of the existing web2 namespace. These TLDs will potentially collide with areas that web3 may have established use cases, as the prevailing applicants in ICANN's process of assignment might end up being different parties than the web3 project stakeholders. This can potentially introduce conflicts between new web2 TLDs and existing web3 projects, and a solution like the collision mediation and explicit rule configuration of the present invention can diminish the disruption that might be caused, should ICANN make such assignments.

SUMMARY OF THE PRESENT INVENTION

The present invention is a fully integrated internet infrastructure solution allowing browsers, devices, users, and developers to access and resolve Domain Names within web3 namespaces not associated with the standard ICANN IANA root. Through this infrastructure, a wide range of consumers can seamlessly connect to, and resolve, web3 domains, blockchain domains, and web2 domains.

Granting access to an unregulated web3 domain name space introduces the potential risk of domain name collisions across differing web3 namespaces. Additionally, there is the inherent risk of accessing domain names linked to illicit and/or hazardous content.

Addressing the concerns of naming collisions and DNS misuse are fundamental aspects of the present invention, also referenced as the "NOTO Protocol." Through this invention, the Noto Protocol seeks to proactively confront and mitigate these challenges, ensuring intentional, safe and secure access within an unregulated domain landscape.

By bridging the standard web infrastructure with the web3 domain environment, the present invention also delivers the necessary technical tools to normalize browsing experiences. This encompasses conventional website features such as DNS servers, SSL certificates, and analytical tools designed for in-depth industry monitoring and research. In short, the present invention is a pioneering solution to conventional issues within the web3 internet.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein:

FIG. 12 shows the hierarchy of elements in blockchain namespace TLDs that the present invention indexes.

FIG. 13 shows the hierarchy of elements in the DNS Root and TLDs that the present invention indexes.

FIG. 20 provides tables that help detail the example of weighting and how it is calculated, in support of the present invention's example Collision Mediation.

DETAILED DESCRIPTION OF THE PREFERRED EMBODIMENT

Figure 1:
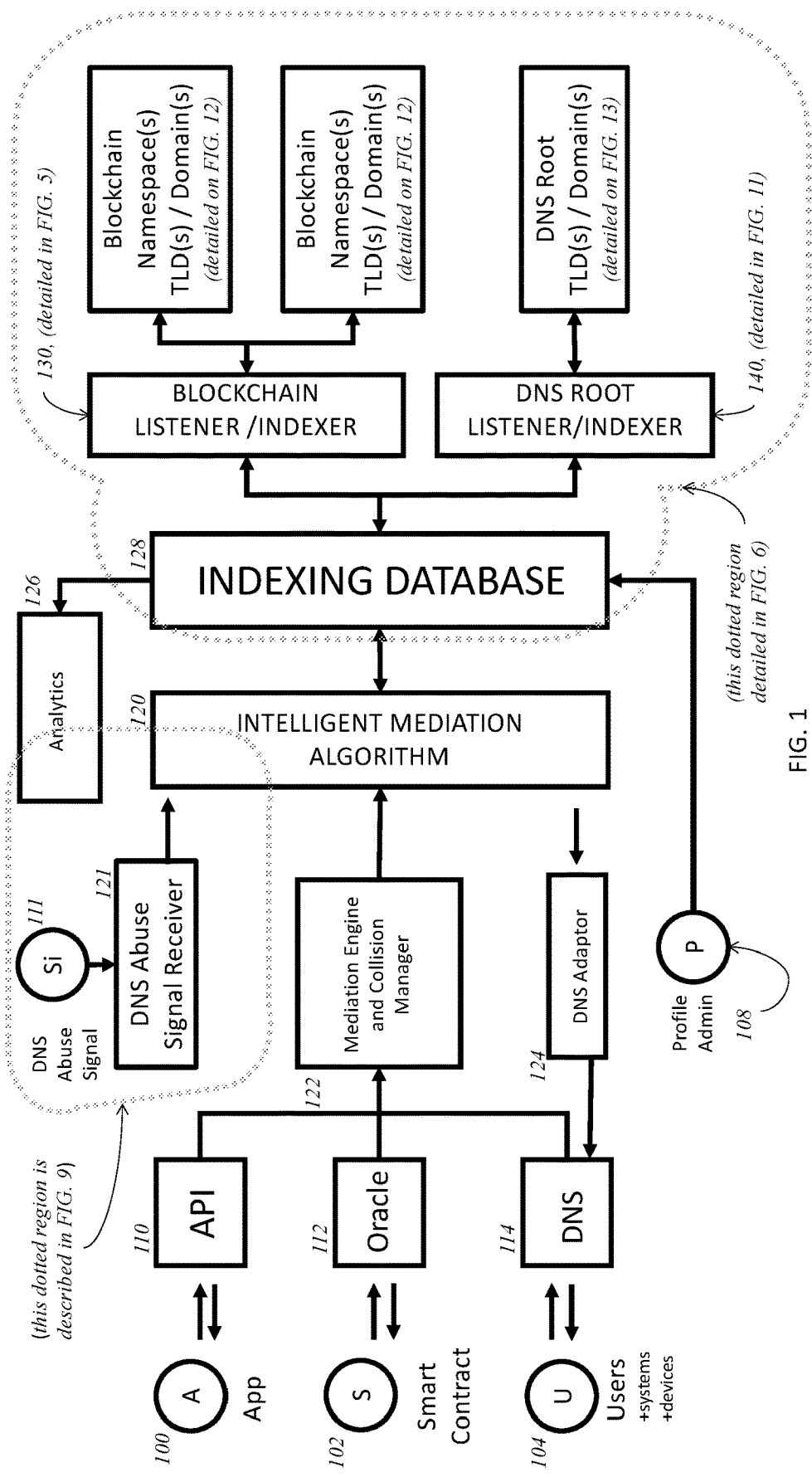
FIG. 1 is a flow chart which explains how the system of the present invention is structured and the architecture behind the system.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention is an IaaS (Infrastructure-as-a-Service) platform, supported by a system and protocol, that enables users to customize and personalize the resolution of domain names and namespace of similar profile, inclusive of all blockchain (web3) domain names, allowing the user to create and manage configuration of DNS servers for resolution using a simple platform that is open to countries and institutions to allow for moderation to create a safe internet. While current technology allows users to manually create their own DNS server where users can manually operate and create their own Zones within the domain name space, this is more complicated on web3 domains. In contrast, the system of the present invention is configured to simplify and automate these processes for all blockchain domain names in web3.

Further, the present invention enables detection of domain abuse on web3 domains. The abuse detection is available as a result of extensive indexing of all web3 domains registered to any blockchain. The system of the present invention, first and foremost, is a means of continuously indexing all blockchain domain names to a database. Indexing is performed by querying all blockchain ledgers and pertinent smart contracts, storing all domain data found in a database, and including all relevant metadata of each blockchain domain within the database.

Further, the system of the present invention then provides an easy and intuitive interface, referenced as a platform (10), to enable users, brands, and companies to create their own configuration rules ("Project"), customize their intentional domain resolution preferences (security and collision management settings) and quickly generate a set of DNS servers specific to the Project that are ready to be used that inherit all the configuration applied to the project. This is beneficial for all entities and services (for example, but not limited to browsers, search engines, email servers, wallets, decentralized applications, payment providers, blockchain protocols, Virtual Private Networks (VPNs), companies' intranets, web communities, protocols, etc.) that need to resolve web3 domains.

Namespaces in Blockchains and the Domain Name System (DNS)

Blockchain Namespaces, TLDs, names, properties and metadata are depicted in FIG. 12. Each Blockchain (1200) is a network or protocol that has properties (1205), within which one or more (1280) Namespace (1210) can exist as records, each with its own properties (1215). One or more (1270) Top-Level Domains (1220) can exist within each Namespace, and those Top-Level Domains can have properties (1225). Within those Top-Level Domains can exist one or more (1260) Domains as records of the TLD (1230). Each Domain can have properties (1240) and records (1250).

DNS Namespace, depicted as the DNS Root Record Model on FIG. 13, consists of the Root DNS (1310) with properties (1315). One or more (1370) Top-Level Domains exist as records (1320) with properties (1325) within the root namespace. One or more (1360) Domain Names (1330) exist with properties (1340) and records (1350) within a Top-Level Domain.

Resolution Process

A Resolution Process is the moment where there is a namespace resolution lookup request by a device for accessing content of a Domain Name. For example, this request can be generated by machine-to-machine communications seeking a resource connection, or it can originate from a user and come from such examples as a browser that wants to access a website from a domain, or a Terminal where a domain is converted into an IP address to establish a FTP or SSH connection. Other namespace resolution lookup examples include requests for name resolution to be performed by a web application to verify a TXT record contained inside the domain, and for a SMTP server to check MX records for forwarding emails. This lookup process can also be used for resolving the wallet address associated to the domain for enabling a wallet user to send cryptocurrencies and tokens to another user of a blockchain. For namespace resolution lookup, the system is configured to identify the process of retrieving records, which is information attached to a Domain Name. This normally happens with DNS servers in standard Web2 Domain infrastructure, but in web3, this scenario is normally not achievable because web3 domains reside outside the DNS root infrastructure or are otherwise accessed outside of the DNS hierarchy, such that it is impossible to resolve them without additional technology.

The namespace resolution lookup process instantiated by the present invention starts from a request that can come from an application based on a user request or because of a software that requires specific data. All the namespace resolution lookup requests, upon authentication, are provided access to a funnel of an Application Program Interface (API) where requests are sent to be handled and responded to. The funnel can be differentiated based on the device, the technology and the tools used for the request. These interfaces are referenced as "Layers" and include the following:

REST API Layer:

Accessible via HTTPS, the REST API interface (110) caters to the application layer of the ISO/OSI model. API Requests (100) must conform to the prescribed API format and utilize the HTTPS protocol. This interface is particularly well-suited for web and mobile applications aiming to support web3 domain resolution. Additionally, it offers moderate encryption and authentication features to limit API usage to a predefined user base of distinct credentialled users. A noteworthy aspect of this API layer is that it has context-aware capabilities, adapting behavior based on authenticated user preferences and intended usage patterns of both the profile and specific credentialled users.

It should be noted that the authentication features employed by the system and platform of the present invention is preferably an authentication mechanism based on an API key. Each API request has an API key which is embedded in the header section of the HTTP request. The API key is generated from the platform of the present invention and is linked to a profile setting of the resolution that a user can create on the platform. Using the API key in the request enables the system of the present invention to understand which profile to adopt for the resolution. In this manner, all namespace resource lookup requests proceed into a pertinent profile which has its own custom rules defining intentional collision management which support and resolve the blockchain namespaces that the user has decided to support, defined for the machine learning to index and accordingly respond. Therefore, the API keys allow for a custom resolution experience for the user based on its settings as established on the platform, enriched or diminished by the additional processing that the machine learning has determined.

It should be further noted that the use of API keys for credentialled access allows one to restrict the platforms and apps from where namespace resolution lookup requests can be called, and the level of usage can be capped. Therefore, a user can choose to set a limited number of IP addresses, HTTP origins, and/or a quota of API requests, enabling the API to refuse to respond if unexpected activity occurs. Among the benefits of this are resilience to unauthorized access or review and misuse of the system for denial of service.

DNS Layer:

The DNS layer (114) provides DNS infrastructure for namespace resolution lookup, aligning with standard ICANN/IANA protocols. By leveraging TCP/IP and UDP, DNS enables device-level name resolution of resources on different web3 namespaces, extending support to networks, routers, operating systems, and applications dependent on internet connectivity (104). Many common protocols such as FTP, HTTPS, and SSH are compatible with this DNS-level resolution.

The system, protocol, and platform of the present invention preferably employs decentralized oracles to facilitate on-chain data provisioning. An Oracle (112) serves as a bridge, sourcing data from off-chain resources (such as weather reports, databases, and applications) and then embedding them into the blockchain. Within the protocol and system of the present invention, this interface layer streamlines domain resolution and validation for blockchain-based smart contracts (102).

Although blockchain data is typically isolated from the wider internet, the machine learning system in the present invention utilizes specialized oracle technologies to interact with blockchains to enable internal information sharing about domain names and content, offering web3 domain resolution for smart contracts and digital assets. In this way, the acknowledgment of the existence of a domain registered in another blockchain, the act of blocking the resolution of a domain, or mitigation of a namespace collision is handled by bringing off-chain logic inside the blockchain via the oracles.

For clarification, in the context of this application, "specialized oracle technologies" are a set of computers, applications and blockchain nodes that, thanks to proper and specific code, run operations that perform data retrieval from outside the blockchain in a decentralized manner. This process ensures that the information coming from inside the blockchain is safer and has not encountered malicious editing. For example, an API exposed from an external server, if called from a legacy application running in a computer, is called once. In the blockchain, the oracle runs the same call from multiple nodes (for example, five times) and then compares the results. If the result is the same in all five, then it is permitted to be imported into the blockchain. The platform and system of the present invention preferably employs the Chainlink™ oracle to run the service of domain resolution inside the blockchain.

Indexing Process

Figure 5:
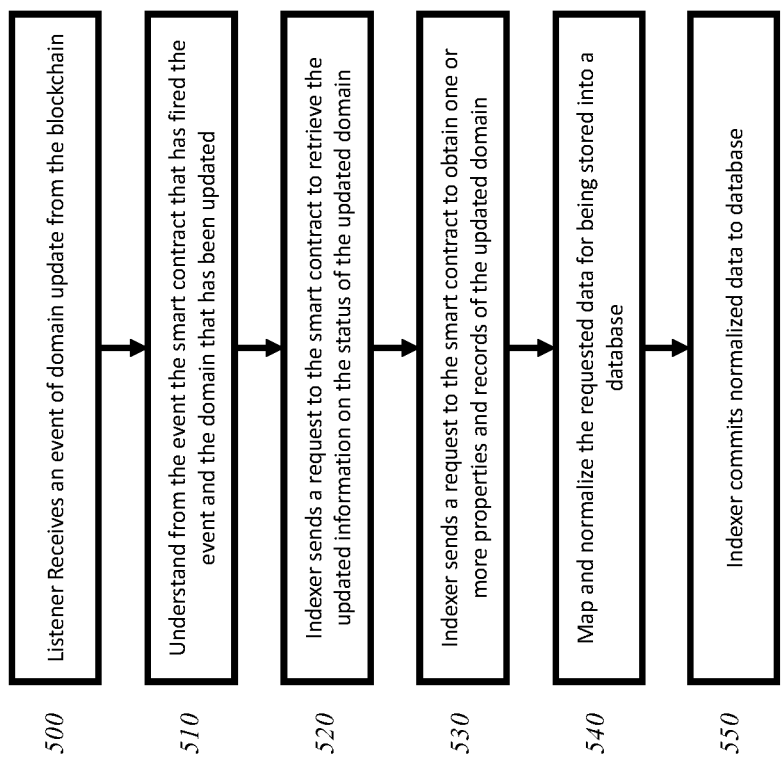
FIG. 5 shows a flow chart detailing the process of indexing a domain from the blockchain.
Figure 6:
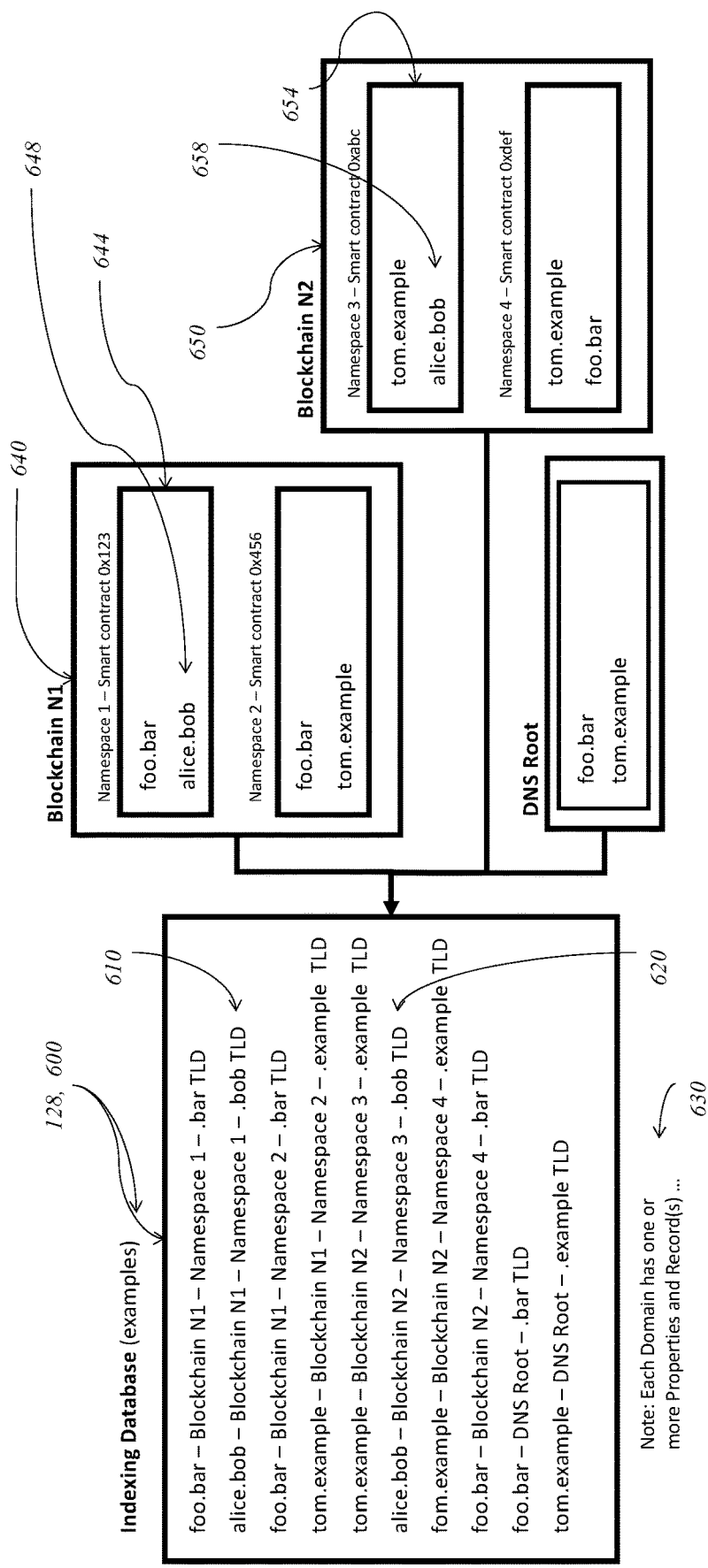
FIG. 6 shows a flow chart detailing the assignment of namespaces of domains listed on smart contracts as they pertain to the indexing of domains performed by the system of the present invention. Note that FIG. 6 is explanatory and does not provide all information managed during the indexing process.
Figure 11:
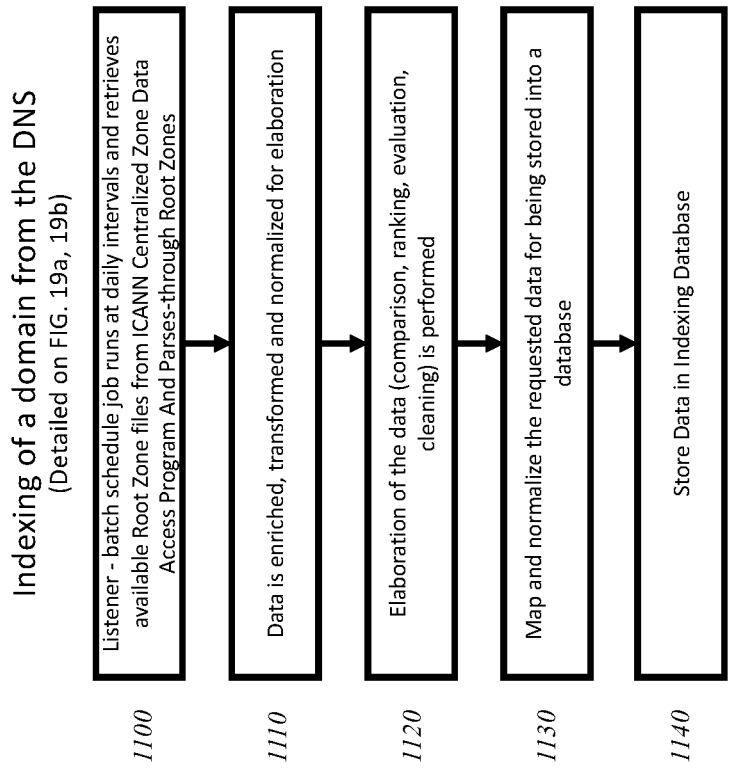
FIG. 11 shows the steps of indexing domain names from the root Domain Name System DNS, or 'web2' for storage in the database.
Figure 19A:
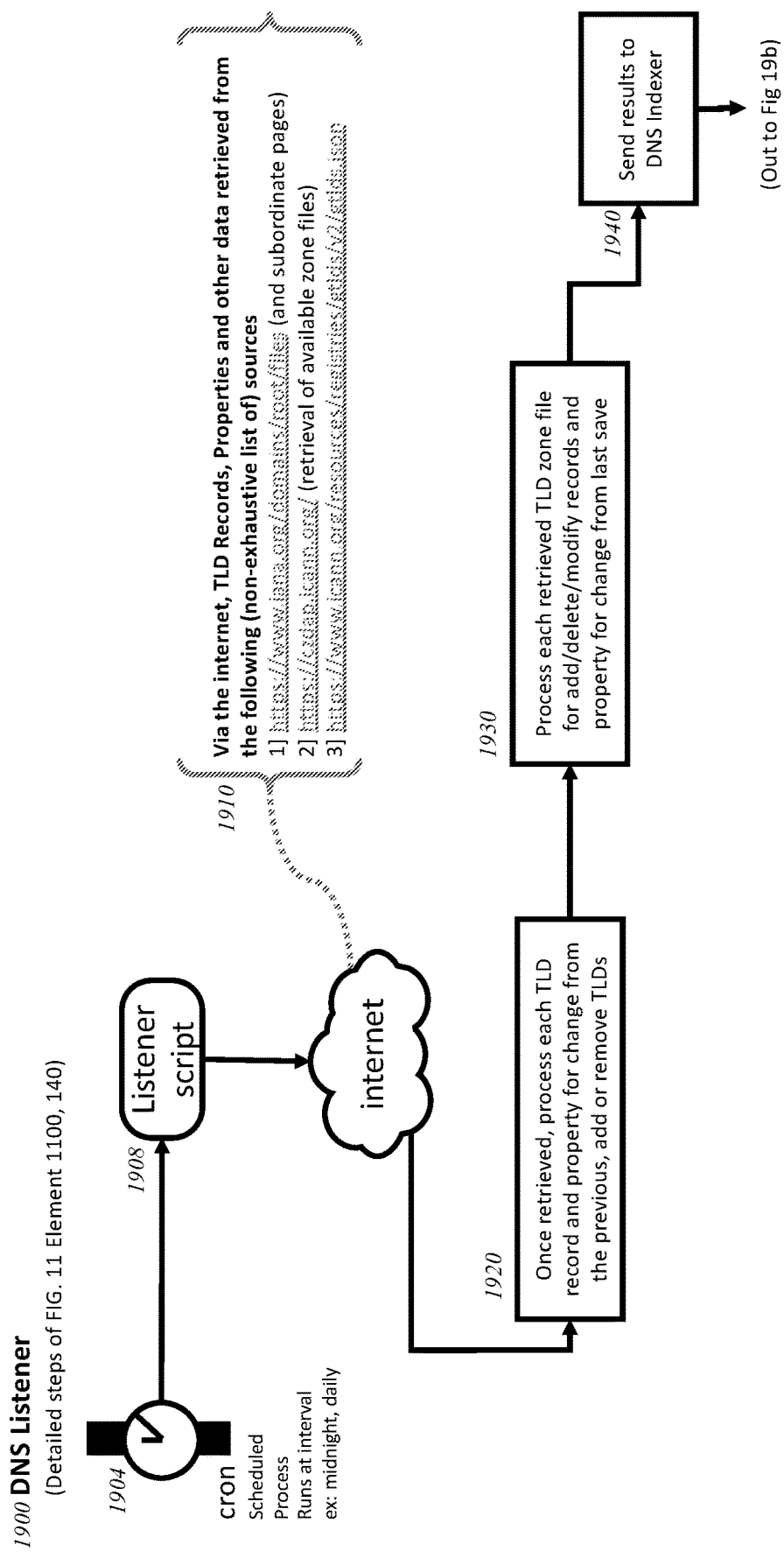
FIG. 19*a* shows the steps involved in greater detail about the Indexing described in FIG. 11 and how DNS Indexing occurs.
Figure 19B:
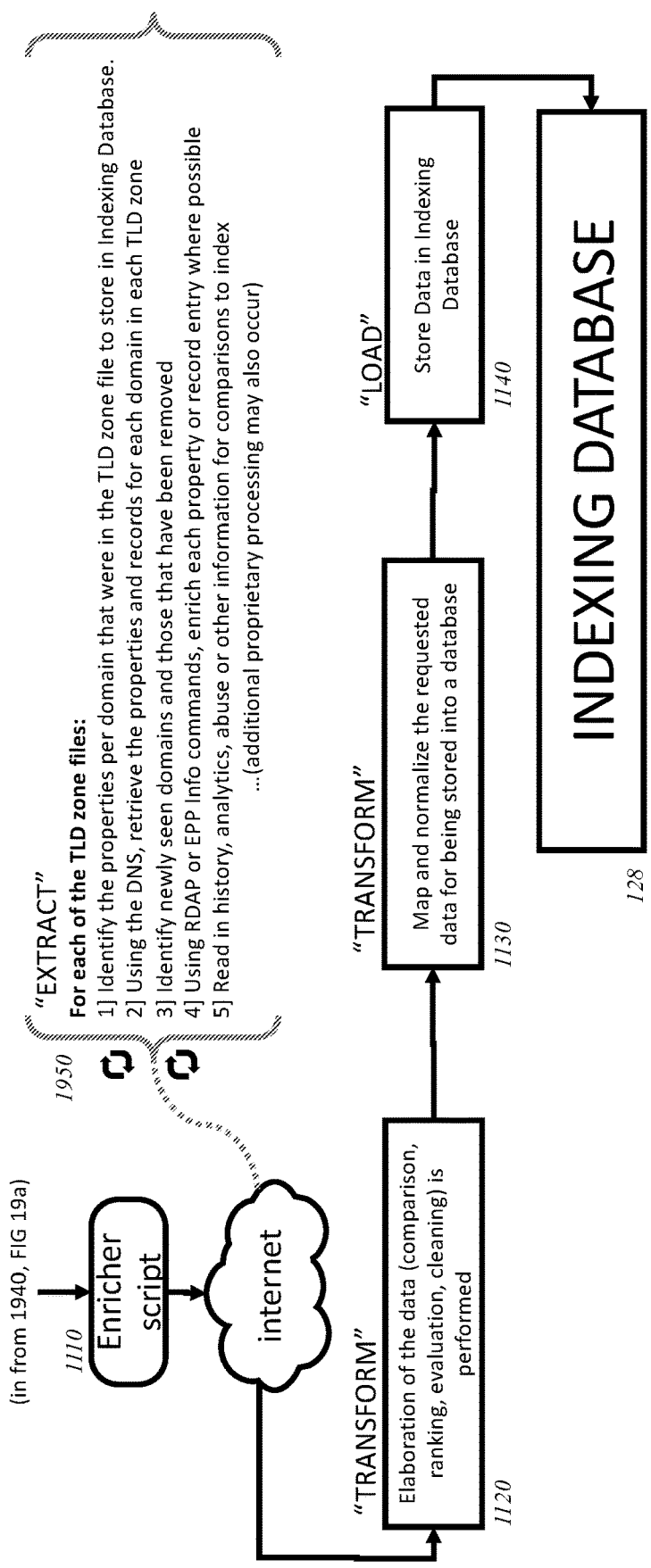
FIG. 19*b* is a continuation of FIG. 19*a* as providing detail to FIG. 11.

The Indexing Process (FIG. 5, FIG. 6) provided by the system of the present invention serves as the backbone for the aggregation of diverse blockchains and their namespaces data into a fully optimized storage repository for domain names, referenced as the Indexing Database (FIG. 1, 128; FIG. 6, 600). There is also a scheduled (1904) process for web2 domain namespaces called a listener (1904, also FIG. 11, FIG. 19a) which uses source data from ICANN Centralized Zone file Access Program (CZDAP) and root zone files (1100, 1910). This process reviews the data and leverages DNS lookups or other means to retrieve properties and metadata (1110, 1940, 1950) as well as mapping changes detected (1120). The indexing process (FIG. 19b, 1940) ensures that all data are extracted (1950 on FIG. 19b), elaborated (1120 on FIG. 19b), normalized (1130 on both FIG. 11 and FIG. 19b) and structured (for efficient querying, retrieval, and utilization within the Resolution Process, Data Analytics, and Abuse Prevention mechanisms of the present invention. The collection of all the domains indexed and their related information, metadata and records contained therein, is important since this database (FIG. 1, 128) is employed by the domain resolution system of the present invention for responding to queries for namespace resolution lookups. Furthermore, this indexing system is critical to end users' insights, analytics and reports about the web3 Domain Name space, and this indexing is utilized for machine learning and optimization of results and responses.

An indexer is a specialized tool designed to scan blockchain ledgers and events systematically, aiming to identify and record relevant metadata, transactions data, and activities data. In the context of the system of the present invention, these are called "block indexers", focusing on domain-related transactions within various Blockchains.

Technical Process Behind Indexing Data on the Blockchain

Figure 21A:
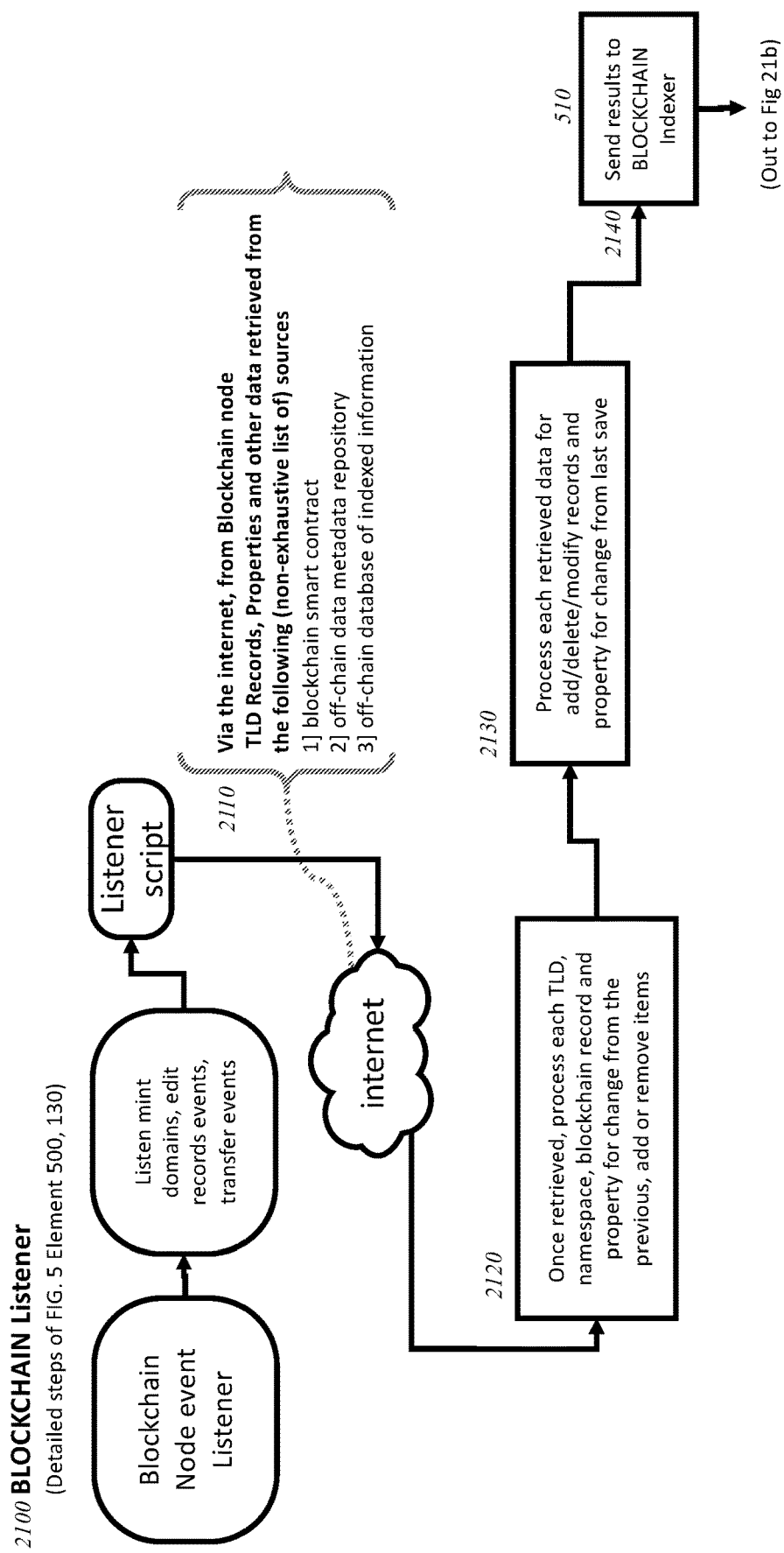
FIG. 21*a* details the blockchain listener as referenced in FIG. 5, 500, 130.
Figure 21B:
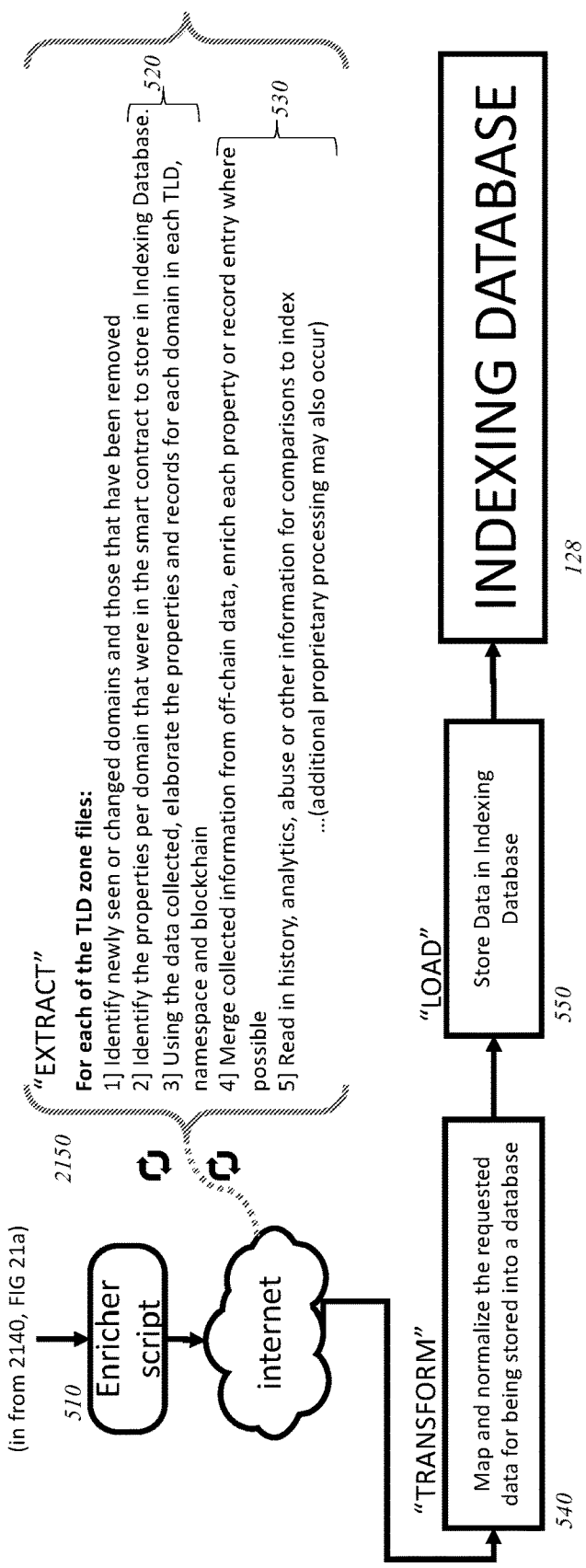
FIG. 21*b* details the blockchain indexer as referenced in FIGS. 5, 510 to 550.

The system of the present invention preferably performs the following process in order to index data of domains listed on the blockchain:

1. Blockchain Domain Event Listening (FIG. 5, 500 and FIG. 21a): The indexing process commences with real-time event monitoring (FIG. 21a, 2100) on multiple blockchain networks. This is achieved through the use of specialized tools, known as block indexers, that continuously scan (2110) for activities such as domain registration or modification as denoted in records within existing domains (including data and/or metadata of domains) (2120, 2130). Upon detection of update or domain modification actions (FIG. 5, 510 and FIG. 21a 2140), the listener will take further action (FIG. 21b). This event listener runs on the blockchains where supported web3 namespaces reside. Example events or activities for which scanning is conducted include, but are not limited to: domain registration, domain renewal, domain record update (DNS, crypto, etc.), domain transfer, domain listing in the marketplace, and domain burn (deletion) (2150 FIG. 21b). It is envisioned that multiple event listening mechanisms are employed by the present invention, such as Etherscan and Moralis. Further, some event listening mechanisms are internally constructed and employed in tandem with known scanning mechanisms. As blockchains evolve, the system of the present invention is configured to record all other future events as detected via the scanning mechanisms. The listening mechanisms and scanning mechanisms of the present invention can vary in their interaction with different blockchains, as required, based upon the architectural differences or approaches used within their networks to achieve namespace and record creation, management, retrieval and deletion.

2. Event Detection and API Handling: When an event is detected (FIG. 5, 510), it triggers a communication to a dedicated Application Programming Interface (API) for internal processing inside the system of the present invention. This is where the event listener tools transmit essential details including the identification code of the affected domain, the originating blockchain, and the domain's namespace (FIG. 5, 520). It should be noted that other details may be obtained, however this includes the minimum required information to determine which domain has triggered an event.

3. Blockchain Data Retrieval: Leveraging the received information, the indexer establishes a direct connection with the corresponding blockchain. The indexer of the present invention retrieves all relevant data and records tied to the registered or modified domain, including the properties of the name itself, as well as data and records within the name (FIG. 5, 530). Examples of properties, data and records that can be indexed include, but are not limited to:

domain name
   owner information
   This can be the wallet or a smart contract address, if blockchain, or information (if available) from whois/rdap if instead the name is DNS-based, and whois or RDAP are available and publish this information
   registration date (also called minting date)
   expiration date (if set)
   Blockchain
   Namespace
   TLD of the domain
   s this a favorite of the owner
   (Determined if this name has PTR record defined and reverse lookup at an
   IP address this domain points to)
   Domain status(es) from Registry (or Registrar)
   This might be 'clientTransferProhibited' or 'serverHold' as examples
   event timestamp
   domain records contained (DNS, crypto, etc..)

4. Normalization: Post-retrieval, the data undergoes a normalization process (FIG. 5, 540). This involves standardizing various data types and structures to conform to a unified schema, thereby facilitating easier database storage and subsequent querying.

5. Database Storage: Finally, the normalized data is committed to a database, which serves as the go-to repository for all domain-related information. (FIG. 5, 550)

By incorporating diverse event listener triggers, this indexing process streamlines data acquisition, ensuring direct data sourcing from the originating blockchains without the need for third-party intermediaries. This enhances both the integrity and reliability of the indexed data, making it robust and dependable for real-time domain data uses. The database housing the indexed data is easily referenced via the APIs of the present invention, facilitating use of the index by search engines and other pertinent parties.

Collision Management process

The Collision Management Process (FIG. 10) of the present invention is the workflow of activities and technologies used to manage blockchain naming collisions that can occur during the Domain Resolution Process. A Collision Management Engine of the present invention serves as an integral component of the solution which is essential for navigating the complexities of Domain Resolution Lookup and mediating conflicts between similar blockchain domains originating from multiple namespaces and/or blockchains, as well as those which occur between Web2 DNS namespaces in Web3.

The term "Collision" should be understood to mean that a lookup/resolution is triggered on a domain name that is not unique. This can happen in the blockchain space because two or more identical domain names can be issued in one or more blockchains and/or smart contracts. This can also happen where a blockchain namespace may have used a name that becomes delegated in the DNS.

Figure 10:
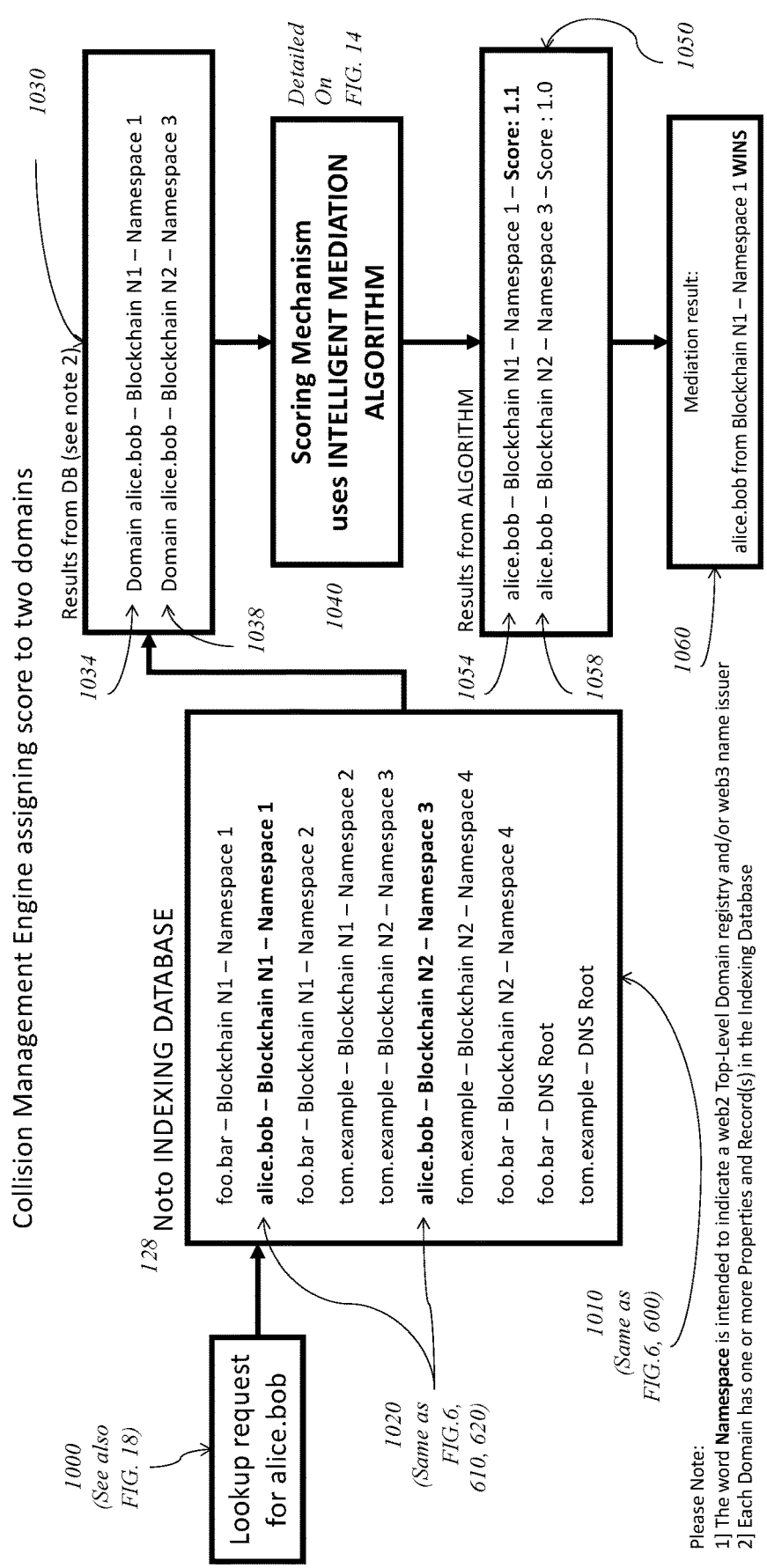
FIG. 10 provides a flow chart detailing an example instance of the collision management engine assigning a score to two domains and mediating the conflict where namespace records are in conflict.

The Collision Management Engine (FIG. 1, 122; FIG. 10) is executed when a collision occurs between two or more identical domain names that are issued in the same and/or in different blockchains, or in the DNS. The execution starts with the application of a score (via a score mechanism) to each domain in collision and, finally, the domain name with higher score is retrieved as the resolved one.

Figure 18:
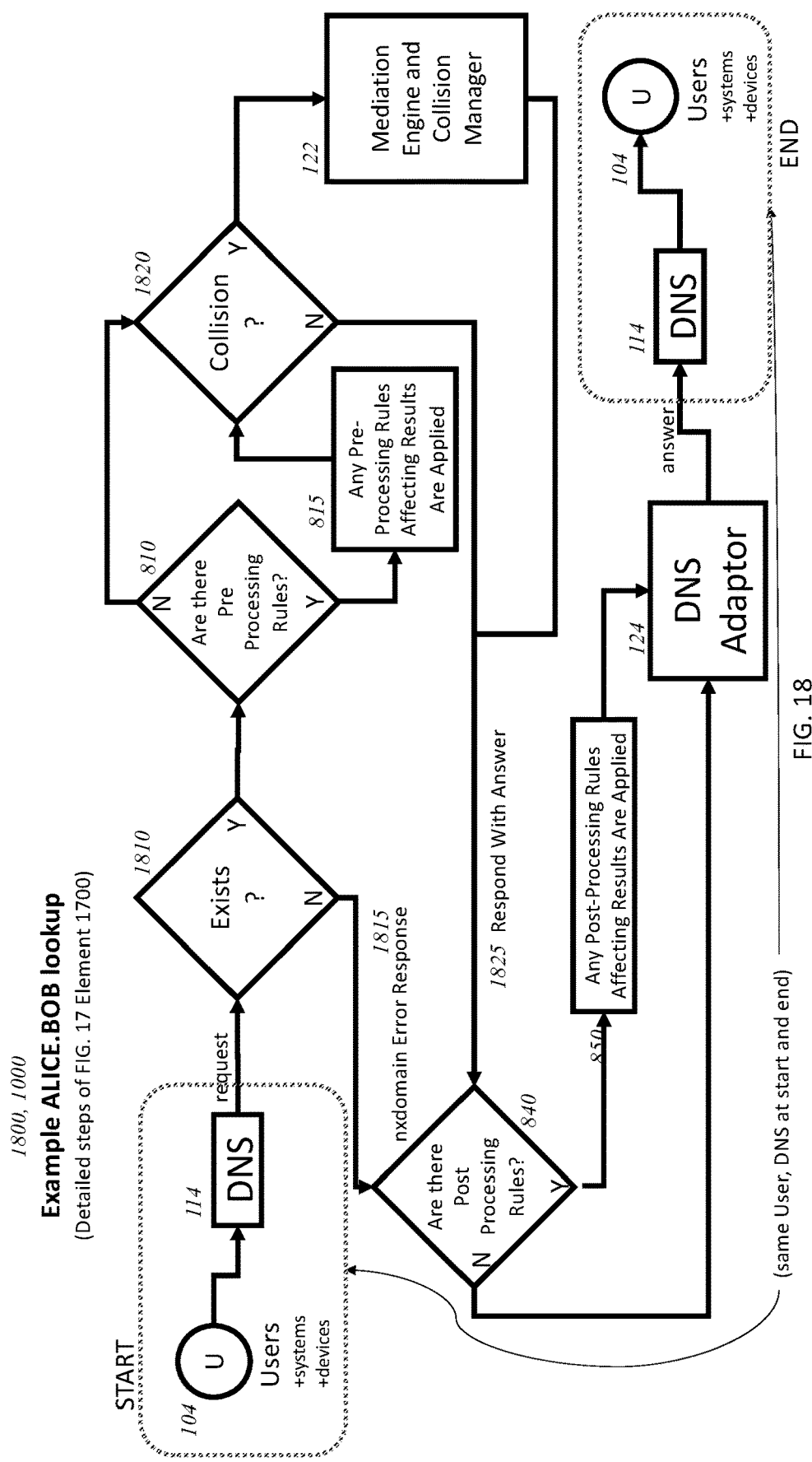
FIG. 18 depicts a process overview of a lookup from FIG. 17 where ALICE.BOB would be requested and receive an answer from the present invention.

Considering the scenario where a request has been made for the domain "alice.bob," (FIG. 10, 1000, FIG. 20) which the present invention quickly looks in INDEXING DATABASE (FIG. 10, 1010; FIG. 6, 600) and determines it exists (1810), and if it does not, it quickly responds with an error (1815), but if it does exist, further determination (FIG. 18, 1820) of it existing in more than one blockchain as a collision (FIG. 10, 1020; FIGS. 6, 610 & 620), each different and in-collision between the .bob from a namespace 1 on blockchain N1 and within a .bob TLD in namespace 3.

In this example table, we show an illustrative outcome where there exist two .bob on different blockchains, and also, there is an alice.bob active in each, and we have received our first lookup request for returning records in the DNS (1825) for alice.bob.

The Intelligent Mediation Algorithm has placed a request for the properties of all alice.bob on all matching records in the Indexing Database for review and the following demonstration. The following illustrative detail results (FIG. 10, 1030) are returned:

| Name | Namespace | Registration Date | blockchain | TLD Unique/Total | Number of DNS records |
|---|---|---|---|---|---|
| alice.bob | bob | 2023 Jun. 10 | N1 | 0.1 | 10 |
| alice.bob | bob | 2022 Feb. 28 | N2 | 0.2 | 1 |

Figure 14:
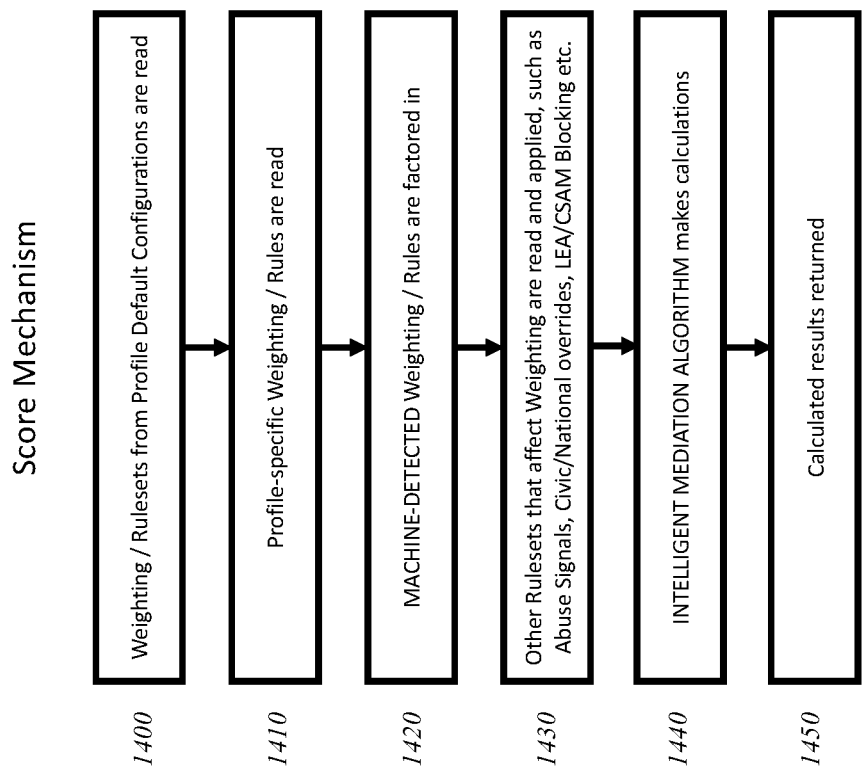
FIG. 14 provides a flow chart of the score mechanism of the present invention.

The Scor Mechanism (FIG. 14) is a tool of the Collision Management Engine that is applied based on a set of configurations, with pre-existing ones called "Default Configurations" (FIG. 14, 1400) and custom configurations which are specified by the User in its profiling configuration (set per Profile) (FIG. 14, 1410), and upon machine learning that attenuates multiple inputs and logic beyond these rulesets (FIG. 14, 1420). Some non-exhaustive examples of the inputs the machine-learning may factor could be blockchain network reachability, similar resources from other DNS Abuse signals, or requestor credentials or usage rate limits. Finally, all other weight/ruleset configurations are applied (FIG. 14, 1430), and the Intelligent Mediation Algorithm then performed, provides output calculations (FIG. 14, 1440). The configuration communicates to the Collision Management Engine how the score is calculated (FIG. 14, 1450). Each point given to a domain is done through an analysis and comparison of different qualitative and quantitative characteristics of a domain (such as, but not limited to, registration date, blockchain, namespace, traffic, age of resolution, etc.) and a weight for each characteristic which helps define the actual score for the domain name.

Some of the characteristics used in this process are at the domain level (2000), some at the top level (2010) or namespace level, and some are at the blockchain network level, as depicted in FIG. 20. An example of this would be where the top level data in the Indexed Database would be evaluated for the Unique record to Total record ratio (2020), with the rationale being that were all other things equal, one could apply weighting preferences to select a domain whose TLD had more distinctive entries as a percentage of the overall number of known records, that TLD would be preferential to one which had a lower ratio. We call this TLD Unique/Total or TLD_UT.

An example of the scoring application being employed in the Collisions Management Engine of the present invention is as follows:

alice.bob from .bob (FIGS. 6, 610 & 648) in namespace 1 (FIG. 6, 644) on blockchain N1 (FIG. 6, 640) has:
registration date: 2023 Jun. 10
blockchain: N1
TLD Unique/Total: 1000/10000 or (0.10)·
number of DNS records: 10
alice.bob from .bob (FIGS. 6, 620 & 658) in namespace 3 (FIG. 6, 654) on blockchain N2 (FIG. 6, 650) has:
registration date: 2022 Feb. 28
blockchain: N2
TLD Unique/Total: 2000/10000 (or 0.20)
number of DNS records: 1

As part of this illustrative example, within the preferences for the Intelligent Mediation Algorithm, a configuration preference setting was made that assigns weighting to the different indexed properties with values between 0 and 1 in the following way:
oldest registration date: weight 1
TLD Unique/Total: weight 0
number of records: weight 0.1

The Intelligent Mediation Algorithm then uses these weighting preferences with the domain properties to perform calculations from these example data sets. The steps of this calculation using the illustrative data were applied.

As detailed in FIG. 20, the Domain Name Properties (2000), Top-Level Domain Name Properties (2010), Calculated Variable Properties (2020) and Assignment in Weighing in Calculation (2030) are looked up and calculated.

The example profile weighting would take the oldest record, that with the earliest date will be assigned a 1, and the weight setting multiplier will be 1 for this property, the number of DNS records property will be multiplied by 0.1, and the TLD Unique/Total property shall be multiplied by 0.

Applying this illustrative weighting to illustrative properties related to alice.bob on the .bob of namespace 1 on blockchain N1 (1034) would result in the following:

| Formula<br>Weight * Property | Expressed<br>Illustrative Data/Weight | Result |
|---|---|---|
| (oldest *<br>weightOldest) | (1 * 1) | 1 |
| +(numberOfRecords<br>weightNOfRecords) | +(1 * 0.1) | +0.1 |
| +(TLD_UT *<br>weightTLD_UT) | +(0.1 * 0) | +0 |
| =Score | =1.1 | =1.1<br>(FIG. 10, 1054) |

=+
alice.bob from the .bob on namespace 3 of blockchain N2 (1038):

| Formula<br>Weight * Property | Expressed<br>Illustrative Data/Weight | Result |
|---|---|---|
| (oldest<br>weightOldest) | (0 * 1) | 0 |
| +(numberOfRecords *<br>weightNOfRecords) | +(10 * 0.1) | +1 |
| +(TLD_UT *<br>weightTLD_UT) | +(0.20 * 0) | +0 |
| =Score | =1.0 | =1.0<br>(FIG. 10, 1058) |

This simplified example is based upon the three illustrative properties and their respective illustrative weighting preferences, and the mediated (1060) collision winner (victor domain) is alice.bob on .bob from blockchain N1, as it prevailed with a higher result outcome.

Figure 7:
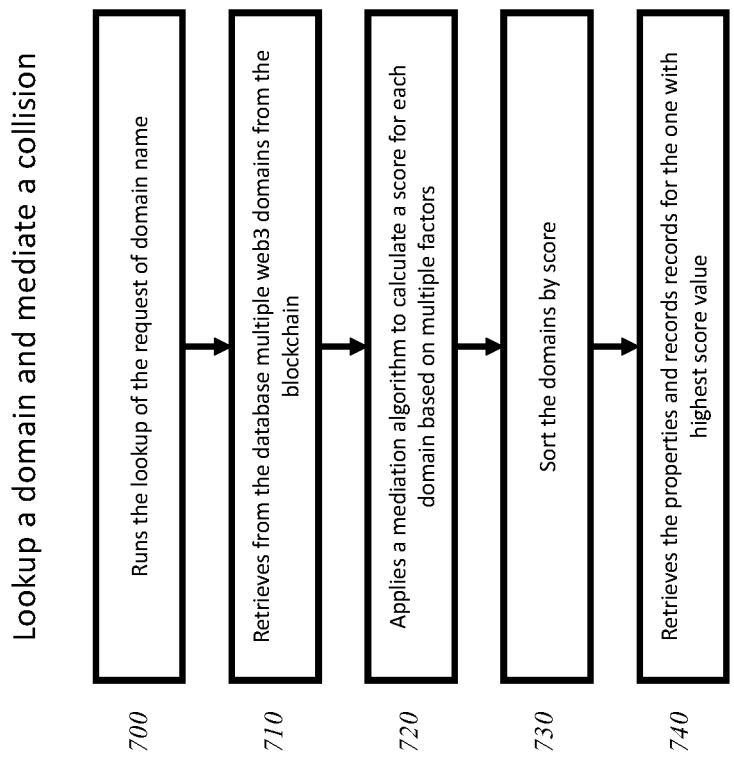
FIG. 7 depicts a flow chart of the process by which the system of the present invention resolves a domain and handles a collision in web3 domains and/or blockchain space.

In simpler terms, the same example is provided below:
The blockchain domain "alice.bob" is registered (1020) in both the .bob in namespace 1 on blockchain N1 and in the .bob namespace 3 on blockchain N2.
The domain in .bob from namespace 1 (blockchain N1) has a specific set of records and properties, as does the domain in the .bob from namespace 3 (blockchain N2). These records and properties are retrieved and inspected.
Records attributed to each name (FIG. 15, 1500) include, but are not limited to:
The blockchain network it exists on and its properties, such as its name and when it was created
The namespace or provider of the TLD and its properties, such as the smart contract minting or creation date
DNS Abuse Signals
  about the domain, namespace/provider, blockchain
  about the destination(s)
    MX records of mail providers of known abuse
    A, AAAA, A6, CNAME records of known abuse
Properties specific to the name itself
  The token id of the name (if blockchain namespace TLD)
  The registration date of the name
  Nameservers for name, and associated DNS entries, associated wallet (if blockchain namespace TLD)
  associated metadata for the name
    Creation Date
    RDAP data snapshot (if non-blockchain, and such is available) or (if blockchain) data stored on and off-chain that is available
    Renew/Expiry information
    Security records
      DNSSEC related data, where present
      TXT, SPF, DMARC, DKIM, SRV, and other records, where present
    Additional (optional) DNS data.
      LOC-Location records from DNS
      NS, HINFO
      CERT, CAA
      other classes
  Historical data on the name
    Contact information on previous owner(s) (where available)
    Information about transfers between parties or providers
    Information about the associated nameservers when they change
    Date of change
    Former entries at time of change
  Snapshots of records
    Frequency of lookups
    Records with Timestamp
  minter smart contract (if blockchain namespace TLD).
A condensed view of the process is shown in FIG. 7, steps 700 to 740.

The scoring algorithm (FIG. 10, 1040; FIG. 14), of the present invention uses these as inputs, and uses weight factors to compute collision mediation. There are default profile configurations defining how the inputs and weights are to be handled, which are then supplemented by the preferences expressed by the user in the profile, and these are augmented by any attenuation determined by the machine learning. The scoring algorithm then considers all similar records between the two colliding domains, assigns a weight and a value to each similar record between the two colliding domains, and determines the winner of the collision (1060) by the highest scoring domain.

There are a number of properties that a namespace, blockchain or domain name may have, and the present invention will constantly be determining the manners to use properties and their associated weights through expressing them as rules. For illustrative purposes, the alice.bob example of the present invention (as detailed in FIGS. 16-18) demonstrates how the scoring is applied using three properties and associated weighting and rules to express them. The present invention shall have a larger quantity of properties as input, and more categories of weight, expressed as rules, in normal operation. The quantity and categories of actual properties and weights expressed through rules that shall be used by the scoring algorithm is anticipated to evolve and become more elegant.

Figure 15:
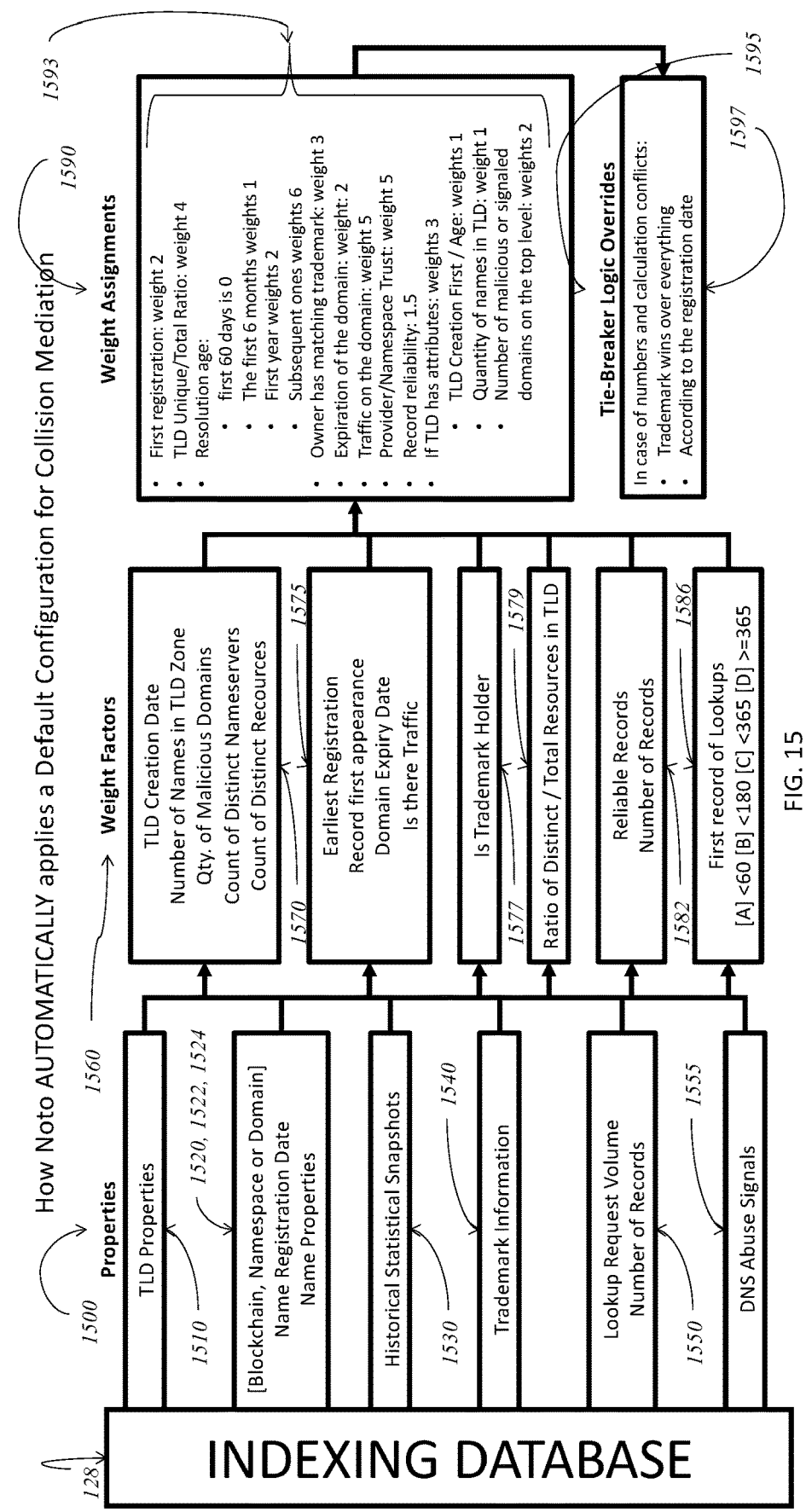
FIG. 15 describes how the present invention automatically applies its default configuration for collision mitigation using inputs, weights, scoring logic, and tie-breaking.

The present invention uses a sophisticated combination of inputs from a number of sources and applies weights in a similar fashion to what happens in the example as a means to determine a winner in the case of conflict. In FIG. 15 we show a more expansive view of how we use properties (1500) of a TLD (1510), blockchain (1520), namespace (1522) and/or the domain itself (1524), along with analytical data on historical use (1530), marry this with lookup Usage (1550), DNS Abuse signals (1560) and Trademark information (1540), and begin to calculate outcomes.

Figure 8:
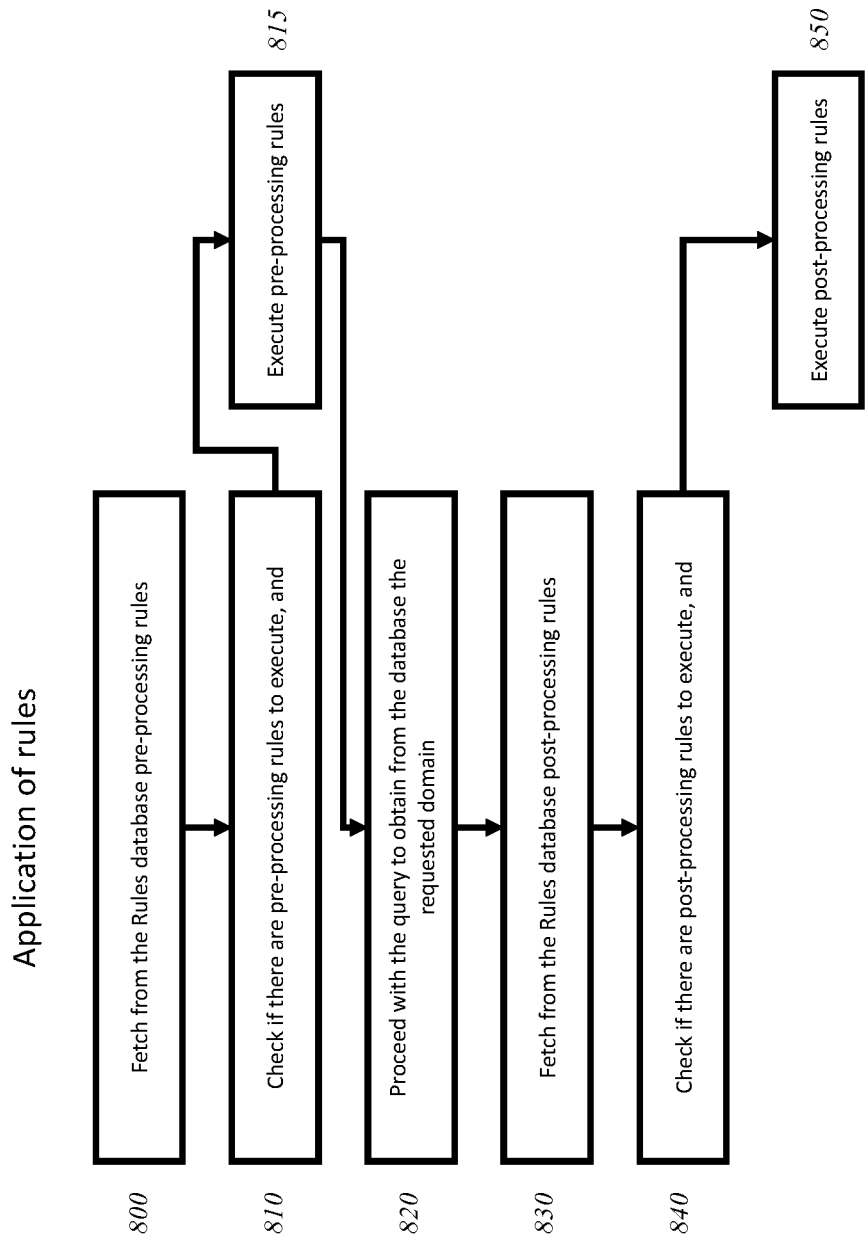
FIG. 8 shows a flow chart detailing the order by which rules are applied in the process of domain conflict mediation.

To enable the system to evolve its configuration of weights, the present invention introduces a concept called Rules (FIG. 8). Rules represent a dataset of information that tells to the Collision Management Engine (FIG. 6) which configuration and techniques to use for a specific resolution, allowing a mutable, continuous-evolving resolution and collision management engine. The Rules output contains the weights and the values for each record and property used for calculating a domain name collision score, and also provides a resolution shortcut in case there are some predefined resolution settings.

Figure 16:
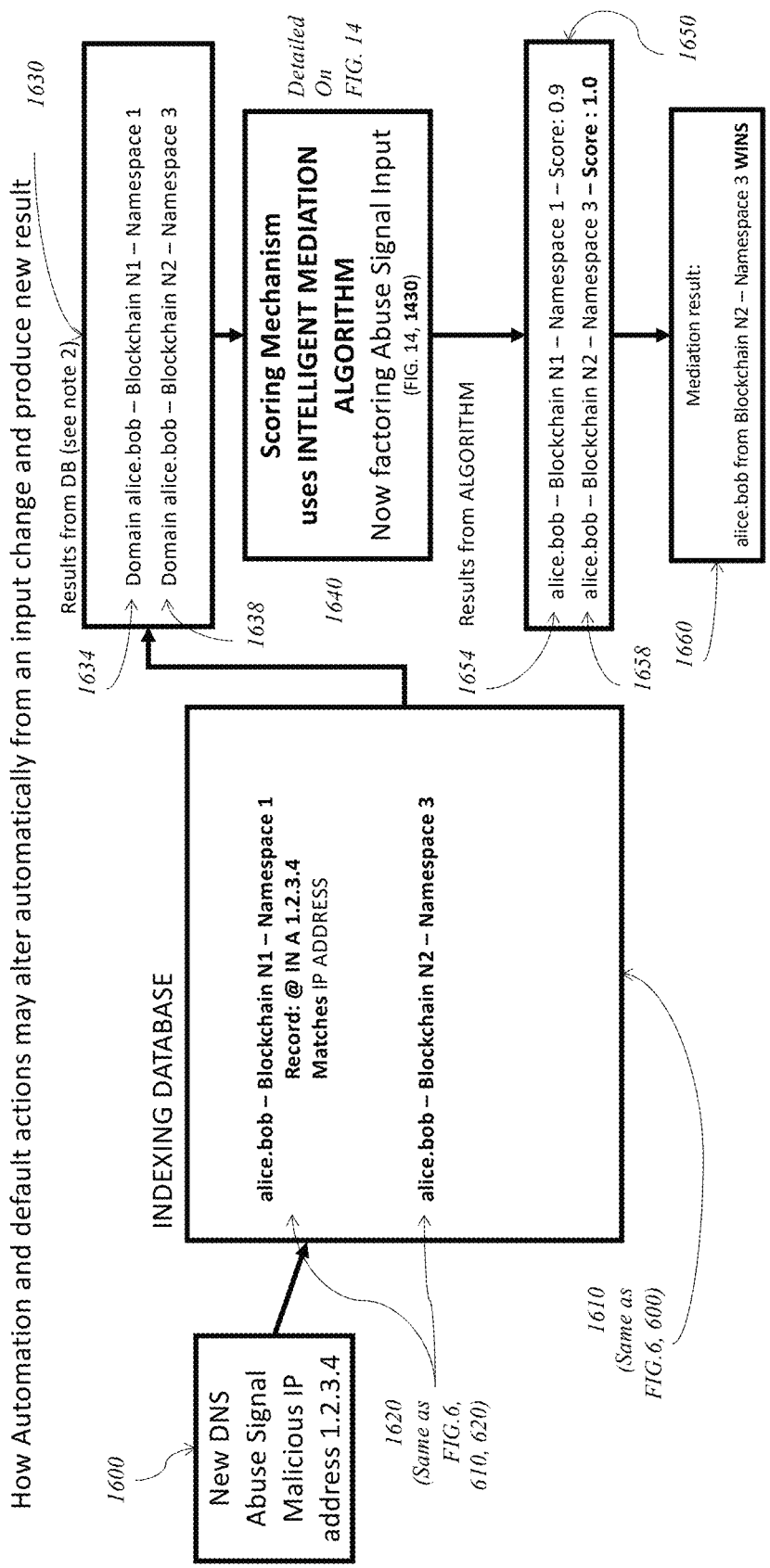
FIG. 16 represents how Default Preset action collision mediation outcomes are affected by changes in input automatically without user interaction, causing alteration to outcome seen in FIG. 10.
Figure 17:
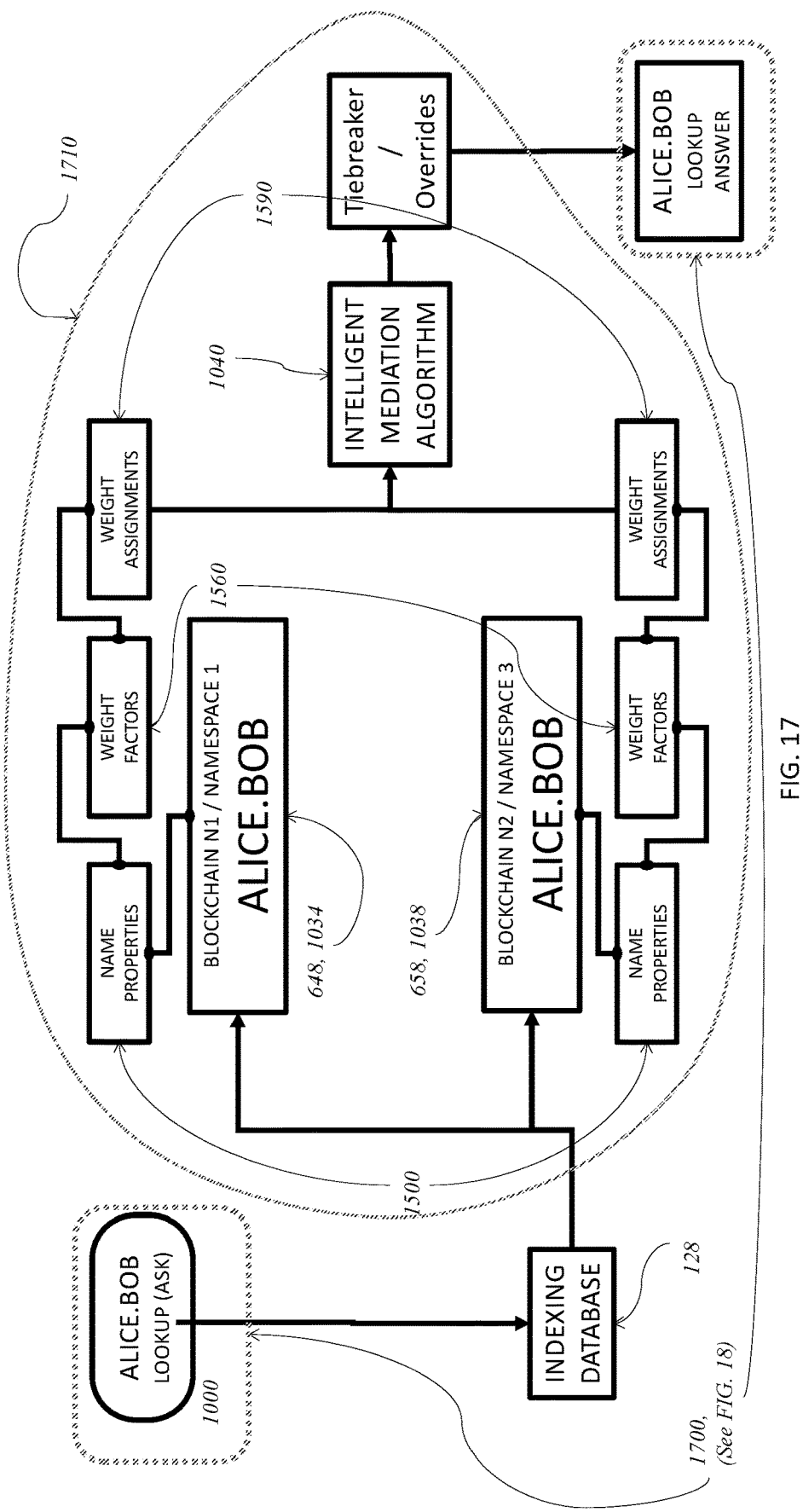
FIG. 17 provides a depiction of how properties, weights and weight assignments are factored into the intelligent mediation algorithm in an example where ALICE.BOB exists in two different namespaces on two different blockchains.

The Intelligent Mediation Algorithm has a default state, which performs automatically, using default configuration Rules. An example of how the default configuration state works is given in FIG. 10. An example of how the collision mediation output of the default configuration alters based upon a change in the input is shown in FIG. 16. The weights used and configured using Rules are updated and changed using a Machine Learning Algorithm which uses the various properties and records of domains, historical usage patterns based upon resolution lookups, historical and current (for Blockchains), DNS abuse signals, and other factors such as statistics on namespace or top level domains to perform and improve the weights distribution based on the requests and the number of collisions that occurs with the scope of creating a more stable and well-performing score application process. Machine learning significantly aids in adaptively determining the weight values in response to varying inputs or outcome changes that arise from the establishment of new rules. Employing machine learning enhances stability, utility and adaptability, as opposed to a pre-set approach which requires ongoing human intervention for continuous improvement.

The Machine Learning Algorithm used for defining and calculating the appropriate weights (and actions) to be applied in the Mediation Algorithm is a Random Forest Regressor. This algorithm takes the features of a domain, which are mapped and normalized for processing by the model. The model utilizes these features from a variety of inputs, some consisting of a set of pre-trained and previously resolved domains (i.e. user behavior patterns) to define and output weight calculations, also evaluating whether the applied weights will lead to the resolution of the given domain.

After obtaining the results from multiple iterations of the algorithm's correct answers, the system can apply the calculated weights to decide which domain to use in the event of a collision. This process also allows for the post-processing of domains marked as "malevolent" from an abuse signal input or where the signal input locates similar domain record resources or patterns in the Indexed Database containing abuse as determined by the machine learning algorithm, applying weights designed to "decrease the chance of resolution." This helps prevent the future resolution of similar "malevolent" domains.

The process enacted via the collision management engine with application of rules of the present invention is shown in FIG. 8, and is detailed below:
1. First pre-resolution rules are retrieved from a rules database. (800)
2. Next, the system checks to see if there are pre-resolution rules to execute. (810)
3. Then, the system proceeds with the query to obtain from the database the requested domain. (820)
4. Then, the system retrieves post-resolution rules from the rules database. (830) (if present)
5. Finally, the system checks if there are post-resolution rules to execute. If post-resolution rules are found in the rules database, they are executed. (840)

The Rules dictate how to process specific requests and manage domain collisions with a precise result. Each Rule is stored in a rules database and is comprised of the following attributes:

Phase of Execution: Specifies whether the rule is to be applied before ("Pre-resolution"/"Pre-processing") or after ("Post-resolution"/"Post-Processing") the domain resolution process.

Conditional Criteria ("Where Condition"): Establishes the prerequisite conditions that trigger the rule's execution.

Priority Ranking: Designates the rule's rank, particularly useful when there's a conflict between multiple rules.

Authority Level: Indicates the hierarchical level of the authority that registered the rule.

Action to be Taken: Specifies the engine's operational behavior if the rule is executed, such as blocking or redirecting requests.

The Rules can broadly be categorized into two types of Rules:

Collision Management Rules: These guide the engine in prioritizing or sequencing namespaces during collisions.

Resolution Rules: These could mandate the blocking of certain requests, redirecting queries to alternate domains, or predefined namespaces based on geographic or other criteria.

With the application of Rules inside the Collision Management Engine, the present invention is capable of resolving all blockchain and non-blockchain naming collisions and distinguishing between profiles of resolution. Rules for managing naming collisions can be also created and/or modified by the User/client who sets the profiling for the resolution, or automated by the Scoring Mechanism Intelligent Collision Mediation Algorithm.

For each new profile created by the user, the platform of the present invention applies a list of default resolution and collision management settings and weights. This set is called Default Rules and is configured to allow the resolution of all blockchain domains with the handle of all the possible collisions that can occur using the Machine Learning Algorithm.

Through the storage of analytics data through typical default use, when using that analytic data as an input, the service may identify the behavior of users and their biases of use, such as more frequently visited sites, and the present invention may make suggestions for profile rules to better match the use.

Additionally, the present invention receives inputs in the form of Abuse signals that might identify a destination IP address that might have a compromised host for a given domain in the signal. The present invention would make a query for that destination IP address against its whole Indexed Database to identify other domains that might also point to that bad IP address, and affect traffic or suggest rules to override the default configuration.

The Default Configuration Profile

In FIG. 15 of the present invention, Properties (1500), Weight Factors (1560), Weight Assignments (1590), and Tie-breaker Logic Overrides (1595) are used in the Default Configuration used in Automation of Collision Mediation. In the default configuration profile, there are properties (1500) retrieved as matches from the Indexing Database (128), including properties related to the Top-Level Domain name (1510), the Blockchain (1520), Namespace (1522) or specific to the domain (1524) like the creation/registration date or properties specific to these. Current lookup request volume (1550) and number of records (1550) are also retrieved for use in scoring, and stored DNS Abuse Signals (1555) are also retrieved. Additionally, Historical snapshots (1530) from past activity time spans support time-bound (1586.A, 1586.B, 1586.C, 1586.D) values for calculation of First record lookups (1586).

Where Collision Mediation is sought using the Default Configuration of the Present invention is performed, Weight Factors (1560) are the component data elements of the names in focus, that can be used in formulas using Weight Assignments (1590), and in the event of ties, Tie-Breaker Logic Overrides (1595) have definitions that solve them (1597).

How the platform automatically applies the Default Configuration for the Collision Mediation:

| Weight Assignments (1593) | | |
| --- | --- | --- |
| Assignment Factor | Description | Weight |
| First registration | Whichever of the subject names has the earliest date of registration/creation | 2 |
| TLD Unique/Total ratio (1579) | Ratio of Unique Records of Name(s) to Total Name(s) in the TLD (in that Namespace/Blockchain where applicable) | 4 |
| Resolution age: | When did requests begin to receive responses with non-error answers (1586) | |
| (1586.A) | First 60 Days | 0 |
| (1586.B) | First 6 Months | 1 |
| (1586.C) | First Year | 2 |
| (1586.D) | Subsequent Years | 6 |
| Owner has matching Trademark | Where the owner is determined to be the trademark holder (1577) | 3 |
| Expiration of Domain | Highest of the Expiration Date of the subject names (1575) | 2 |
| Traffic/Lookup Volume | How many lookups are coming in from unique origins (1575) | 5 |
| Provider/Namespace Trust | Factor number of matches in DNS Abuse Signals, Unique/Total per namespace (1570, 1579) | 5 |
| Record Reliability | Record consistency/Attendance and number of records (1582) | 1.5 |
| TLD Attributes | TLD Creation/Mint Age (1575) | 1 |
| | Quantity of Names in TLD (1570) | 1 |
| | Lowest Number of malicious or signaled names in TLD (1570) | 2 |

The Weight Factors are computed and then summed per name, with the highest value result indicating the prevailing name to return.

In the event of a 'Tie' of numbers or calculation conflicts:
1. Trademark wins over everything
According to the Registration Date How Rules Behave in the API Resolution Layer versus the DNS Resolution Layer The Resolution Processes of the present invention operate differently depending on the Resolution Layer Interface used by the consumer of the request of resolution. Given that the protocol of the present invention integrates a Collision Management Engine that, using rules, handles domain resolution and collision management, it's important to take into account that it cannot be implemented in the same way on the different Resolution Layers, since these use different protocols of communication and technologies.

Figure 2:
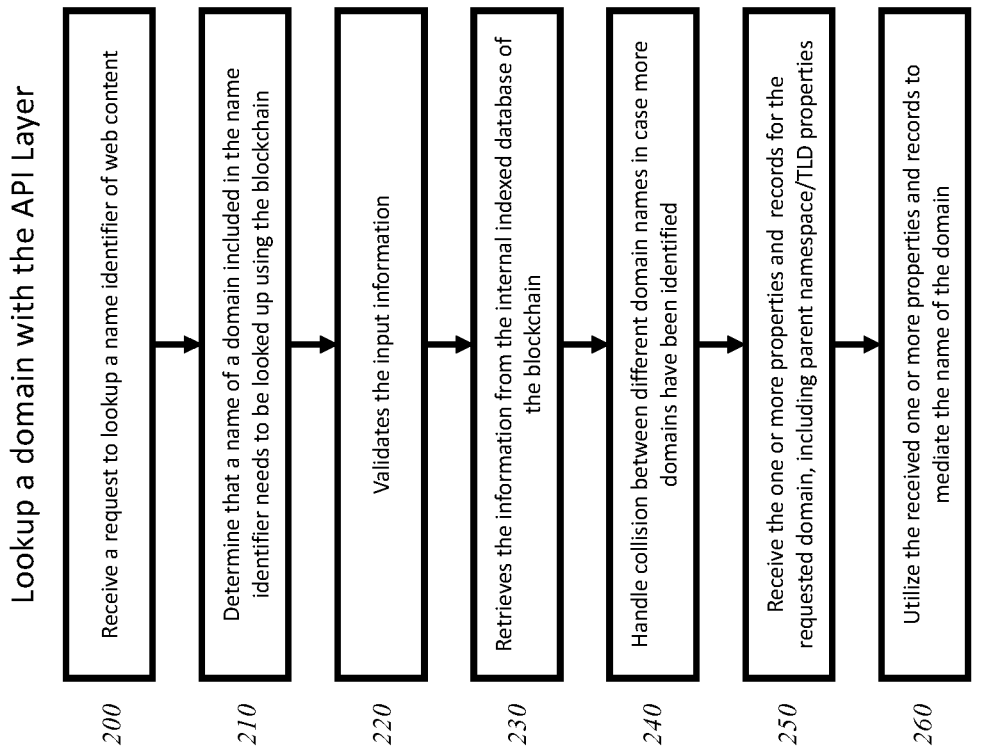
FIG. 2 exhibits a flow chart detailing the process of resolving a domain with the API layer of the system and platform of the present invention.

With this context, it's important to consider the limits of each Resolution Layer Interface. For example, the API layer fully implements the capabilities of the Collision Management Engine as shown in FIG. 2 (steps 200-260), allowing a set of specific rules to be activated at the moment of the resolution of a request, these are:

Pre-resolution processing rules: these rules are triggered and run before any query happens in the database layer, checking if the profile contains any sort of setting available, these include: censorship of specific domains, affectation of abusive domains, or override of standard resolutions defined by the administrator of a Project.

Context-aware rules: these rules occur based on the context of the request, meaning that if the request comes from a country or an organization that blocks specific domains and overrides others, these are executed during the resolution Post-resolution processing collision management checks: if a collision between two or more namespaces happens for the same domain name, the platform handles the resolution following its own techniques and rules but also providing custom user logic which is set up in context-level, allowing the profile to set which one to prefer. In such instances, the custom user logic may be configured to override existing collision logics.

Absolute-override rules: This preferred embodiment is designed to allow administrators the ability to create very detailed rules about processing priority for situations of collision. There is an opportunity to design rules as specific as an override to an individual metadata value within a different namespace where this is compatible with the layers involved.

Figure 3:
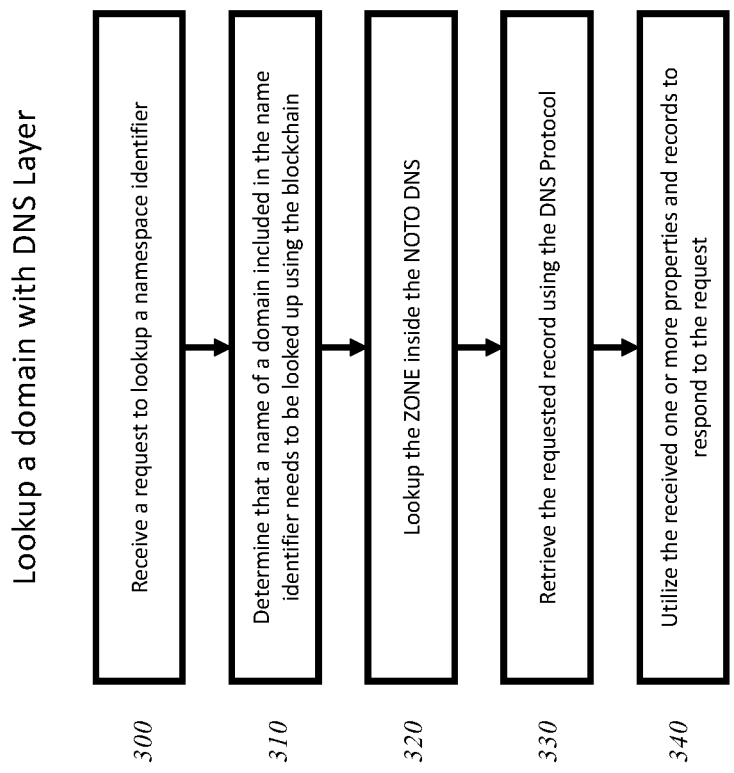
FIG. 3 exhibits a flow chart detailing the process of resolving a domain with the DNS layer.

In contrast, the DNS layer, markedly different from the API Layer, handles the resolution by accessing a dump of the entire resolution of web3 domains where rules have been applied to consider all the possible collisions happening (as shown as a process in FIG. 3, steps 300-340). This resolution process gives access to a subset of the entire collection of domains, allowing only the winners of resolution in cases of collision and removing all censored or not accessible domains in specific regions. It is possible for users to set their own node of DNS that works with the specific logic. The setup of nodes can be done using the Platform of the present invention from where the user can create, for a specific profile, its DNS network. The DNS network uses the resolution and collision management set by the user in the profile.

Finally, the Oracle resolution works based on the logic of the blockchain where it resides. Its ability of computation and data provisioning depends on the capabilities of the Oracle implementation and how the information itself can be processed by the virtual machine of the blockchain adopted. This means that not all the features of resolution provided in both API Layer and DNS Layer can be processed, allowing only to acknowledge the existence of a domain, its owner, where it resides and which record uses for smart contracts.

An even more specific override might be to use an absolute rule, one which could create preference and priority for a specific metadata record that would always return for a given resource, regardless of the collision resolution.

Figure 4:
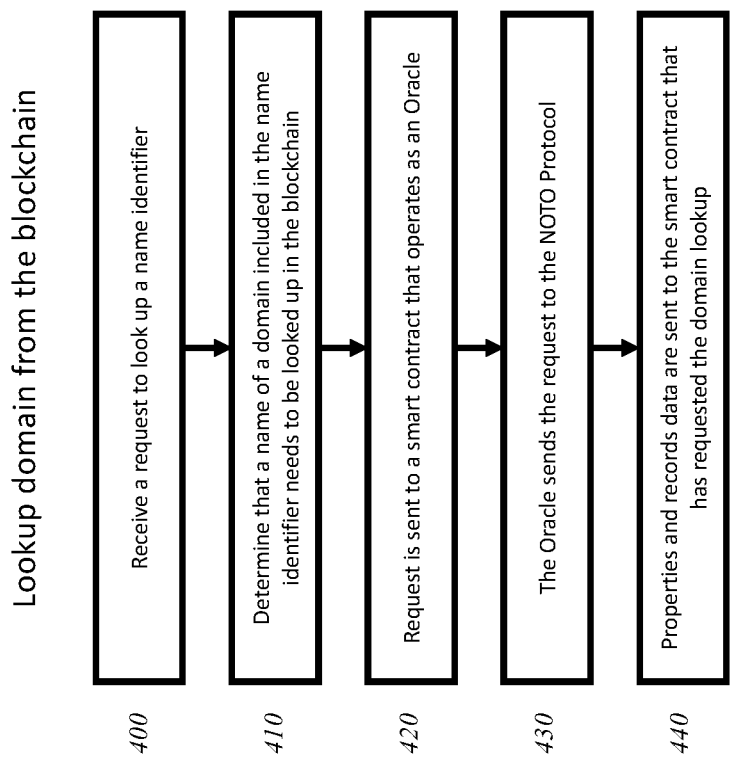
FIG. 4 depicts a flow chart detailing the process of resolving a domain from the blockchain via the system of the present invention.

Having said this, the present invention provides the ability for a smart contract or a wallet address to resolve a blockchain domain of another blockchain using a set of Oracle. The process works as explained in FIG. 4, where a request of resolution is sent by a smart contract or a wallet to an oracle smart contract operating on the blockchain. Prior to this, a verification of the input, whether it's a web3 domain syntax, is necessary. The Oracle smart contract runs an API call off-chain to the API Layer of the present invention to ask for the resolution of the domain. The resolution occurs with the application of all the relevant processes of domain resolution explained before in the API Layer resolution.

After the domain is resolved with the correct application of the Collision Management Engine, the domain is cast to a sub dataset that can be read on the blockchain. The dataset is forwarded to the Oracle node which retrieves the value inside the smart contract that has requested the resolution of the domain. A different variation of the process can occur with a different blockchain that implements another Oracle technology.

Signal and Resolution Management for web3 Domain Abuses

It is known that signal management plays a pivotal role in mitigating DNS abuses commonly encountered within the domain landscape. Such signals are generated and transmitted conventionally by DNS Abuse Management Providers. These entities aggregate DNS abuse reports, scrutinize the data, and then liaise with DNS providers to initiate appropriate corrective actions—be it blocking domains or modifying resolution records. However, unregulated web3 domains present unique challenges given that the conventional DNS-based system cannot be employed. In the current ecosystem, web3 domains lack a dedicated DNS Abuse Management framework, leading to a governance void. This absence poses significant challenges as users transition to a new domain landscape fraught with potential threats in an unregulated market.

Figure 9:
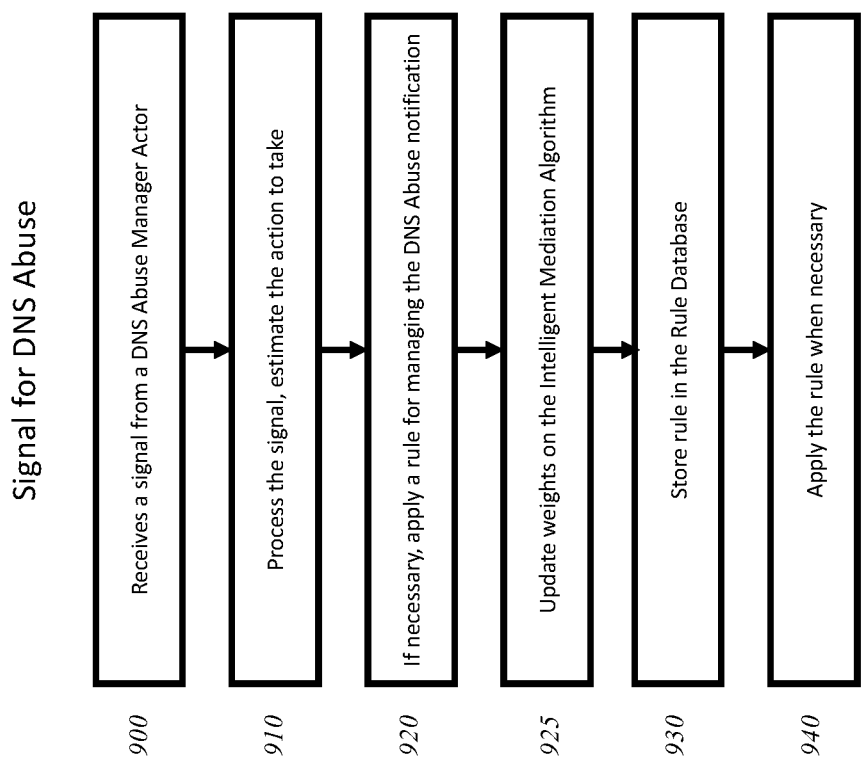
FIG. 9 exhibits a flow chart detailing the steps taken by the system of the present invention upon encountering an abuse report from a DNS abuse manager.

To address these inefficiencies, the system and protocol of the present invention incorporates a comprehensive suite of technologies (referenced as integrated abuse management mechanisms) designed to interpret DNS Abuse signals originating from established DNS Abuse Management Providers as shown in FIG. 9. These signals (900) are integrated seamlessly into the existing abuse reporting infrastructure, extending its capabilities to cover web3 domains.

The system of the present invention is configured to employ a rules-based approach to encountered abuse signals. Upon receipt of an abuse report, the information is conveyed via signals to the Collision Management Engine of the present invention. This engine, in turn, processes the signal (910) and where necessary, (920) institutes a new rule aimed at either blocking or overriding the domain resolution in question, storing it (930) in the Rule Database for it to be applied as needed (940). This rule-based approach ensures a scalable and efficient method to manage abuse in both DNS and web3 domain spaces. By integrating this sophisticated abuse management mechanism, the solution fortifies the security posture of web3 domains, making them less susceptible to a range of potential abuses and ensuring a safer browsing experience for users.

The rules-based approach can be also used by a Machine Learning Algorithm to add and insert rules in advance (920) when a domain is indexed because of an Event Listened. The Intelligent Mediation Algorithm (120) checks and evaluates if a domain can be resolved or blocked based on factors. Presence of a rule blocking or redirecting a lookup request for the given lookup would block a result from receiving an answer or provide a deliberate redirection to specified record results, where the Intelligent Mediation Algorithm (120) would affect the result set of records in a response output to a DNS Adaptor (124) that would be providing a response in DNS (114) to the requesting party (104). An override rule forcing a result to bypass blocking intentionally might allow a blocked entry to resolve. Other factors that could result in the blocking of a result include, but are not limited to:

Domain owner, and if the domain owner has previously received reports of abuse in other of its domains or if it has been reported for dealing with cryptocurrency stealing or malicious activities in the blockchain;

Type of records inserted, if the records of the domain points to an endpoint (such as MX records, crypto addressee, IP addresses or IPFS hash) that has already been signaled for abuse in other domains;

Domain name syntax, if the domain contains prohibited words in a specific country or if the meaning is not acceptable to be used and reached in the internet;

Brands and IP abuses;

Bad or malicious activities on the domain such as frequent transfers and proved stealing.

The Intelligent Mediation Algorithm adopts a Machine Learning Algorithm called Random Forest Regressor to establish and calculate the rank and the possibility for the signaled domain to contain or to be in future signaled again for abuses.

The Intelligent Mediation Algorithm elaborates the information taking as input features of the domain, including owner address and if the owner has in past received signals, records content and if records has been previously signaled and other features such as the namespace of the domain and the blockchain used. After considering all these variables the Random Forest Regressor calculates the classification for the domain outputting an evaluation of the risk for the domain to contain abuses, the risk for the domain to be in future signaled for abuses and the total evaluation of trust for the resolution of the domain in the Default Configuration. Given these results, the Intelligent Mediation Algorithm, applies the information also to the owner address and the records of the domain for future analysis.

The output is then stored into the Indexed Database and used in case of collision and resolution for the requested domain on demand.

Custom DNS

While DNS is versatile, the inherent technical constraints of the basic technology mean that DNS Layers cannot execute runtime rules for resolution and collision management without a solution like that which the present invention provides. Consequently, resolutions that occur only via the DNS Layer lack easily customizable settings and rules, relying solely on the Default Rules outlined by the protocol of the present invention.

However, within the infrastructure of the present invention, there exists the capability to establish and launch a bespoke DNS server. This server seamlessly incorporates user-defined settings and rules as per the guidelines of the protocol of the present invention. Such an arrangement empowers enterprises and communities to operate a tailored DNS Node that not only supports web3 domains but also aligns with their unique business objectives. This approach is ideally suited for corporations, browsers, ISPs, and VPNs seeking to grant users access to the web3 domain name landscape while simultaneously modulating or tailoring the navigation experience to reflect specific preferences. The DNS can be used in all internet devices, for example: a personal computer, a modem, Wi-Fi Routers, smartphones, IoT devices, televisions and consoles. The DNS can be set up via the platform of the present invention using a specific IP address (can be IPv4 or IPv6) or using a specific domain URL following the standard DNS over HTTPS (DOH).

The DNS infrastructure works as a public DNS resolver supporting both web3 and web2 domains, allowing for web2 domains to forward the resolution to a predefined DNS server such as but not limited to 9.9.9.9, 8.8.8.8 and 8.8.4.4 or 1.1.1.1. It should be understood these addresses are examples, and other IP addresses may be used.

The DNS Adapter

The DNS Adapter (124) is where the resulting answers to Users (and systems or devices) (104) requests through DNS (114) are sent from after being processed by the Intelligent Mediation Algorithm. The DNS Adapter is a custom DNS server, which has IP address for TCP/IP or UDP connections to a custom hostname specific to the profile and user, or is representative of a DNS DoH or DoT. Through the combination of the use of DNS over HTTPS ("DoH"), each profile having a distinct account, and the ability to establish recursive nameservers using a subdomain which we can map to the profile of the visitor, Noto users that are active within a profile can be presented specific nameservice results from a custom set of DNS Servers that are usable only by them.

These DNS Adapters provide answers for standard DNS requests, enhanced to also include the superset of the standard DNS Root to include namespaces from blockchains, private corporate DNS/VPN or other expanded namespaces that are on Noto.

Implementation of the Technology Embodied in The System and Protocol of The Present Invention It should be understood that the present invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the present invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term processor resets to one a to devices, circuits, and/or processing cores configured to process data, such as computer program instructions. For the effective deployment of the technology of the present invention, any device, application, circuit, or process must utilize one of the previously mentioned interfaces for interaction and communication.

To facilitate the adoption of the infrastructure layer, the protocol of the present invention provides the platform (10) that enables developers and organizations to set up their own account and from there, set up the "Project" from which they can set up custom resolution settings and to access to the right guides to make a perfect integration of the technology.

API Layer Implementation

To implement the API Layer means using REST APIs via the HTTPS protocol exposed on a specific URL to the internet, where each request is authenticated using an API KEY generated by the developer using the Platform of the present Invention.

As an example, presently the API exposed for handling resolution preferably include, but are not limited to:
  Resolve: returns a resolution for a given domain. It processes the collision management and all the resolution logics;
  DeepResolve: retrieves the list of all possible domains sorted by the highest score. In case of collision, with this API both domains are returned;
  ReverseResolve: retrieves from a given wallet address the list of domains owned;
  Exists: checks the existence of the domain.

The API Layer can be easily implemented in both web and mobile applications, browsers, scripts and other code-based software that can run API requests on the HTTPS protocol. Further, it should be noted that the API Layer may also be used for web2 domains in addition to web3 and/or blockchain domains.

DNS Layer Implementation

To implement the DNS Layer, it is necessary to set up the DNS IP Address (or the DNS URL using DNS over HTTPS) inside the Operative System of the Personal Computer (or within the browser of the personal computer) used by the consumer (or within the specific device, such as an IoT device), or to set it in the Default Gateway Settings of the router (or in case of ISP or VPN, as Default DNS IP address). Using one of those approaches, the DNS is automatically reached by all the incoming requests from devices and applications and can perform domain resolution for both web3 Domain Names and Web2 Domain Names.

Embracing the innovative technology of the present invention, the potential challenges of configuring a custom DNS within a network router or on a Personal Computer have been seamlessly addressed. The system of the present invention preferably offers an .iso installer applications and/or APIs tailored for all major operating systems such as but not limited to smartphones, laptops, tablet, web-servers and personal computers, allowing the DNS IP application to be launched and operated effortlessly. This ensures that even users without technical expertise can enjoy the benefits of the present invention with ease.

On-chain Resolution Using Oracle

The implementation of an Oracle for resolving web3 Domain Names requires skills and knowledge in building smart contracts for blockchain. To implement the Oracle it is necessary to interact with the deployed smart contract Oracles of the protocol of the present invention that consuming an exact number of gas fees and tokens it performs an off-chain query operation to check the existence of a domain and the retrieval of useful information to understand where the domain exists, and what records it contains. This resolution, as for the DNS Layer implementation, works using the Default Resolution Algorithm of the protocol of the present invention.

To facilitate the implementation process, the present invention provides, on the blockchain, a crafter smart contract that enables and implements the on-chain oracles directly configured to perform on-chain domain resolution. A developer can simply implement the provided smart contract of the present invention that performs the process explained in FIG. 4 (steps 400 to 440) to resolve web3 and web2 domains directly on the blockchain.

Implementation of Analytics features

To implement analytics features and start to obtain data and business intelligence information about the Web3 Domain Name space, it is necessary to register and use the platform of the present invention, from where users can obtain an API KEY. The API KEY is required to make API requests dedicated for querying domain names. These queries include:
  findOne: retrieves one result from a query
  findMany: retrieves one or more results from a query It should be noted that the above APIs are examples, and that the present invention is configured to provide additional APIs as needs arise. Custom APIs can also be provided, as pertaining to the needs of the user/customer/organization or client that are configured to analyze the traffic of requests coming to the protocol of the present invention.

Using these features, it is possible to query and retrieve information from the indexing database about Web3 Domains and the data they contain. Further, it should be understood that the indexing database of the present invention exhibits a table of distribution in which all domain names are stored. When data pertaining to domains is updated, the indexing database (128) outputs changes to be usable by the analytics (126)

Potential Applications and Industrial Impacts

The applications of the system and protocol of the present invention encompass diverse use cases within the infrastructural capabilities of running the new internet (decentralized, web3). As previously noted, these services include critical functionalities such as web3 naming collision management, resolution facilitation, DNS setup, abuse prevention, data analytics, DNS security, and SSL certificate issuance. Each service plays a distinct role in enhancing the functionality, security, and overall experience within the decentralized use of the internet, and many of which can be readily employed by search engines and browsers.

Potential applications of the system and protocol of the present invention, as encountered and enacted by an end user include, but are not limited to:

- Seamlessly access web3 domains across all registries and chains: The Collision Management service of the system of the present invention offers a comprehensive solution to oversee and resolve naming conflicts within the web3 space. It ensures that domain names remain unique across multiple registries and blockchains, enabling interoperable and conflict-free navigation for users across the internet.
- Create and manage one's own decentralized Top-Level Domain: The system and protocol of the present invention offers the capability for brands and large companies to independently create and manage decentralized Top-Level Domains (TLD). This service allows users to establish and control the identity and scope of their TLD independently within the decentralized web3 ecosystem, enabling greater customization and management of their domains, communities and users. Whereas this is theoretically possible without the present invention, one stands the risk of the choice of Top-Level Domain at some point being delegated by ICANN and causing conflict/collision issues. The present invention thoughtfully and intentionally solves this challenge.
- Securely access any web3 domain straight from your favorite browser: Allowing the use of web3-enabled DNS, the system and protocol of the present invention provides users with the capability to directly browse any web3 domain from any browser. This service simplifies and enhances the user experience, allowing direct access to decentralized websites and services without the need for any complex configurations.
- Create and Setup individualized web3-enabled DNS nodes: With the DNS Node Generator of the present invention, users can independently set up their own web3-enabled DNS node. This capability grants users' greater control over their DNS functionalities within the decentralized web3 environment, allowing for customized and personalized DNS management.

Figure 22:
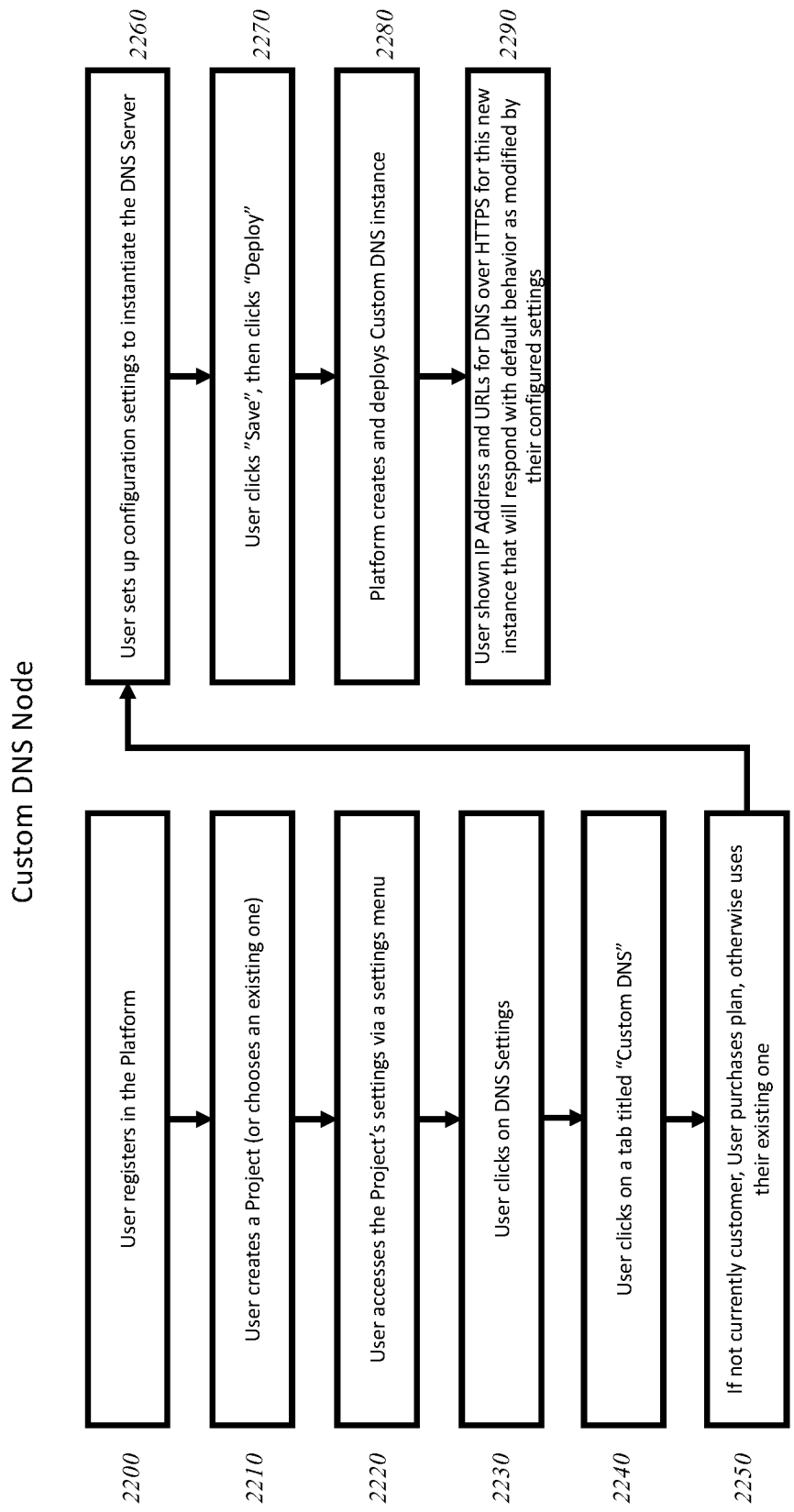
FIG. 22 represents a flow of user activity in configuration and generation of a custom DNS server instance

As depicted in FIG. 22, the process to obtain a custom DNS Node via the system and platform of the present invention is as follows (from User point of view):

1. First, the User registers in the Platform of the Invention. (2200)
2. Next, the User creates a Project (or chooses an existing one). (2210)
3. Then, the User accesses the Project's settings via a settings menu. (2220)
4. Then, the User clicks on DNS Settings. (2230)
5. Next, the User clicks on the a tab titled "Custom DNS." (2240)
6. Then, if prompted, the User has to purchase a Plan (if necessary). (2250)
7. Then, the User sets up configuration settings to instantiate the DNS Server. (2260) This means to set DNS properties such as, but not limited to:

Zone of deployment (for e.g. Asia, Europe, USA)
Custom HTTPS URL for DNS over HTTPS (if applicable)

8. Then, the User clicks "Save" and then clicks "Deploy" to instruct the platform to enact the User's selected custom DNS settings. (2270)
9. Then, the platform of the present invention creates and deploys a customized DNS instance. (2280)
10. FInally, the User is shown with IP Addresses and URLs for DNS over HTTPS that the User can use as proprietary DNS nodes that correlate with the settings input by the user to the platform. (2290)

- Gather usable data intelligence of the whole web3 internet: A Data Analytics service of the present invention collects and analyzes valuable intelligence data regarding the usage and operation of the entire internet in web3. This service provides tools and insights to the internet industry stakeholders for better decision-making and technological improvements. The service is achieved with the usage of specific APIs that allows Business Intelligence Platforms and databases to fetch these data, and runs queries for aggregating them.
- Use data analytics and signals to prevent online abuses and harms: Using data analytics and specific signals, the Abuses Prevention service of the system and protocol of the present invention aims to prevent, report, and take swift action in the identification and prevention of any kind of online abuse. The system and platform of the present invention plays a crucial role in maintaining a safer online environment by actively addressing and preventing abuse-related content.
- Set Customized Browsing Security Parameters: This service of the platform of the present invention empowers users to establish their own browsing security parameters. Users can tailor their security preferences, enhancing their online preferred safety levels while navigating across the web3 internet.
- Increase web3 security of your websites: The system and protocol of the present invention facilitates enhanced security by issuing and offering SSL certificates for web3 websites. This service significantly strengthens security measures for websites operating in the decentralized web, ensuring increased protection against potential cyber threats and vulnerabilities.

Industrial impact of widespread adoption and implementation of the system and protocol of the present invention preferably includes, but is not limited to:

- Blockchain and web3 Internet Industry: The system and protocol of the present invention is positioned to have a transformative impact on the blockchain and web3 internet industry, especially considering the complex and fragmented nature of the web3 naming landscape. With the multitude of naming services operating across diverse blockchains, establishing uniformity and standardized rules becomes an increasingly challenging necessity. The system of the present invention is poised to step in as a pioneer to bring order by implementing rule-based approaches using advanced technology. Its emphasis on ensuring unique and conflict-free naming across an array of web3 domain name registries and blockchains lays a foundation for a more reliable and structured infrastructure within the web3 identity ecosystem, crucial for an harmonized web3 naming interoperability. These capabilities are particularly essential and highly sought after by various web3 infrastructural services such as wallets, decentralized browsers, website builders, smart contract developers, blockchain oracles, blockchain scanners, and more. The system and protocol of the present invention optimally provides these invaluable services, addressing the critical need for standardization and enhanced security within the evolving web3 landscape.

Internet Operators' Industry: Within the internet operators' industry, the system and protocol of the present invention plays a pivotal role in the internet operators' industry by prioritizing efficient resolution management, allowing traditional internet operators such as browsers to handle web3 complexities like indexing, resolution, and naming conflicts. It enables users to safely browse web3 domains using traditional DNS settings. The services of the system and protocol of the present invention are tailored to facilitate traditional mail providers in integrating decentralized technology into their current SMTP protocols, effectively managing new email addressing requests arising from the usage of the web3 internet.

Additionally, by leveraging the web3 DNS capabilities of the system and method of the present invention, VPNs and ISPs can integrate their customized versions of private web3-enabled DNS. This concerted effort signifies a shift in operational strategies, demanding operators to adapt to an ever-evolving landscape that emphasizes decentralized security and resolution mechanisms, ensuring a safer and more secure use of the decentralized internet.

Traditional Registrars and Registry Industry: For the traditional registrars and registry industry, the system and protocol of the present invention presents a technology that enhances the ability to include web3 domain names in their offering. The ability to manage naming conflicts and provide solutions for robust and secure naming management via APIs across diverse web3 registries and Blockchains within can revolutionize and enhance the existing domain management practices. This stands to impact how traditional registrars operate, requiring adaptation to meet the demands of the evolving decentralized domain landscape facilitated by the present invention. The platform and system of the present invention makes this adaptation process easy and seamless.

IP Protection Industry: The system and protocol of the present invention serves as a pivotal solution for the Intellectual Property (IP) protection industry, offering a robust infrastructure for managing digital identities and web3 assets within the decentralized naming system. Alongside enhanced security measures, it plays a vital role in protecting and securing intellectual property. Notably, the protocol extends its functionalities to assist IP protection services and brands by scanning the web3 naming system for potential IP infringements. It also aids in the search for IPs to safeguard and offers data intelligence to empower decisive actions to protect intellectual properties within the rapidly evolving decentralized internet landscape. Its capacity to prevent abuses, maintain naming integrity, and safeguard digital identities signifies a potential redefinition in the operations of IP protection mechanisms.

It should be noted that alternative embodiments of the present invention may employ machine learning in greater capacities to expedite collision management procedures, including, but not limited to amending the aforementioned rules in accordance with learned preferences of the user, and alterations to network architecture.

Preferred embodiments of the present invention present a novel avenue for wallet and/or domain recovery. Web3 and/or blockchain domains are not managed by the system and platform of the present invention itself. However, as the system is managing traffic from inside domains on the blockchain, the platform of the present invention provides a tool for recovery. In the event that a user loses their private keys of their wallet, they may initiate a KYC process behind their domain. As the user can be verified as the owner of the blockchain domain, first the system performs additional checks to ensure that the blockchain domain hasn't been sold or transferred. After the requisite checks are performed, the system is configured to allow the user to register a new domain on another platform. Via the settings of the platform of the present invention, the user may then configure the old blockchain domain to be redirected to the newly registered blockchain domain. Therefore, users can create a new blockchain domain having the same name as the old blockchain domain (albeit with differing ledger data), establishing a functional equivalent without necessitating an impossible retrieval of a private key of the old domain.

Please note, for FIG. 12:
1] Dotted/Dashed lines are present to clarify context to representation of entities in between each view 2] Each Namespace are Records of Blockchains; TLDs of Namespaces; Domains of TLDs. 3] For clarity and simplicity of this diagram, Icons a-e, dotted lines/symbols depict the properties/records of the first item from the left, but each horizontal item would have them in a more complex and complete depiction 4] There are some Namespace that opt to exist on more than 1 blockchain. Such scenarios would be similarly represented and are considered in the Loaders, Indexing Database and Scoring Method of the Intelligent Collision Mediation Algorithm.

Please note, for FIG. 13:
1] Dotted/Dashed lines are present to clarify context to representation of entities in between each view
2] Each TLD are Records of DNS Root; Domains of TLDs.
3] For clarity and simplicity of this diagram, Icons b-e, dotted lines/symbols depict the properties/records of the first item from the left, but each horizontal item would have them in a more complex and complete depiction.

Please note, for FIG. 16:
1] The word Namespace is intended to indicate a web2 Top-Level Domain registry and/or web3 name issuer
2] Each Domain has one or more Properties and Record(s) in the Indexing Database Please Note: For this illustration (FIG. 20):
1] there are two ALICE.BOB, [A] is the one from Blockchain N1, Namespace 1; [B] from Blockchain N2, Namespace 3.
2] "oldest" formula results in the match being assigned weight, others will be set to 0.

3] The Asterisk (*) in formulas is intended to represent "multiply."

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A method for handling domain collision, comprising:
collecting, normalizing, and storing disparate domain data to an indexing database, the domain data found within at least one of the following: blockchain ledgers, traditional DNS data and domain registry metadata;
accessing the indexing database for domain records and domain metadata pertaining to a first web domain and a second web domain;
evaluating, using at least one processor, the indexed data, any learned adjustments therein, and user-defined preferences;
assigning scores to the first web domain and the second web domain based upon the domain records and the domain metadata;
wherein the domain records and the metadata are chosen from the following: publicly available whois; RDAP lookups; publicly available DNS Zone files; Blockchain records; DNS Lookup results; DNS Abuse feed data; Domain Marketplace data; Search Engine data; Domain status and expiration; Analytics data from use and logging;
using the respective weights and values available that were returned from the indexing database, adjusting for any user-defined preferences; and
determining the winner of the collision by selecting the highest scoring domain.

2. The method of claim 1, further comprising:
assigning scores dynamically using the weights and values and a machine-learning model trained on historical conflict resolution data;
resolving domain collision through weighted algorithms applied to metadata derived from blockchain and DNS systems, optimizing for resolution latency and security and the number of collisions occurring; and
wherein the first web domain and the second web domain are each of a domain type selected from the group: web3 domain, web2 domain.

3. The method of claim 1, wherein information from the indexing database is chosen from the group, where available: domain name, owner address, registration date, domain records contained, expiration date, namespace, blockchain, smart contract to which the domain is connected, TLD of the domain, and event timestamp.

4. The method of claim 3, further comprising:
providing lookup results from the requested domain; and
wherein at least one server computer facilitates execution of the method.

5. The method of claim 2, wherein information from the indexing database is chosen from the group, where available: domain name, owner address, registration date, domain records contained, expiration date, namespace, blockchain, smart contract to which the domain is connected, TLD of the domain, and event timestamp.

6. The method of claim 2, further comprising:
providing lookup results from the requested domain; and
wherein at least one server computer facilitates execution of the method.

7. The method of claim 4, wherein the first web domain and the second web domain are each of a type selected from the following group: a web2 domain, a web3 domain.

8. A system for handling domain collision, comprising:
a multi-node server infrastructure, wherein at least one server computer hosts domain resolution platform, the server computer being connected to:
a distributed ledger network for retrieving blockchain-based domain registration records, and
a traditional DNS infrastructure for integrating web2 domain name data;
an indexing process and database, accessible by the at least one server computer, the database being configured to:
store and maintain structured domain metadata, including domain ownership, registration timestamps, abuse signals, and resolution history;
continuously update domain records retrieved from web3 blockchains, web2 DNS zones, and private namespaces;
support high-speed query execution for domain lookup and conflict resolution processes;
further comprising a domain conflict detection module, executing on the at least one server computer, the module configured to:
identify a first web3 or web2 domain in potential conflict with at least one additional web3 or web2 domain; and
query the indexing database to retrieve records and metadata for all conflicting domains;
further comprising a collision management engine, executing as a process on the server computer, the engine comprising:
a rule-based scoring system, configured to apply predefined default configurations and custom configurations to assign priority scores to conflicting domains;
a scoring module, wherein:
a first score is assigned to the first web3 or web2 domain based on weighted domain attributes;
a second score is assigned to at least one additional web3 or web2 domain using the same weighted attributes;
a mediation and resolution module, wherein:
the collision management engine compares the first score with at least one additional score,
the highest-scoring domain is designated as the authoritative resolution outcome;
the resolution decision is stored in the indexing database for future queries and system audits;
at least one server computer hosting a platform;
the at least one server computer accessing an indexing database;

wherein the indexing database contains records and metadata relating to a domain selected from the following group: web3 domains, web2 domains;
a first web3 or web2 domain and at least one additional web3 or web2 domain conflicting and in need of resolution;
the at least one server computer querying the indexing database for domain records and domain metadata pertaining to at least one additional web3 or web2 domains;
a collision management engine executing on the at least one server computer;
the collision management engine assigning a first score to the first web3 or web2 domain based on default configurations and custom configurations;
the collision management engine assigning a second score to at least one additional web3 or web2 domain based on the default configurations and the custom configurations;
the collision management engine comparing the first score to at least one additional score; and
the collision management engine determining the winner of the collision by selecting the highest scoring domain.

9. The method of claim 8, further comprising:
wherein the default configurations and the custom configurations communicate to the collision management engine how to calculate the first score and at least one additional score; and
wherein the custom configurations are tailored to the preference of the client with rules such that weights and values for each web3 or web2 domain record(s) and metadata exhibit variations from the weights and values of the default configurations.

10. The method of claim 9, further comprising:
an Intelligent Mediation Algorithm employing machine learning to inform the rules of the custom configurations that improves the weights distribution used to derive the first score and at least one additional score based on the requests; and
the number of collisions that occur, providing an increasingly better score application process over time.

11. The method of claim 1, further comprising:
utilizing a mediation engine and collision manager configured to interact with an indexing database via an intelligent mediation algorithm;
wherein the intelligent mediation algorithm performs iterative processing that includes at least the following:
retrieving records from the indexing database using default weighting and rulesets, profile-specific weighting and rule overrides, machine-detected weighting factors, and civic/national overrides;
applying mathematical computations using a scoring algorithm to assign scores to conflicting domains based on domain attributes and metadata;
integrating rule-based preferences to modify default scoring outcomes, including pre-processing and post-processing rules;
dynamically adjusting scoring outcomes based on signals received from abuse detection systems, analytics modules, or user-defined configurations; and
continuously self-updating the configurations and scoring algorithms based on learned affectations derived from historical conflict resolution data and external inputs; and
wherein the mediation engine and collision manager utilize the outputs of the intelligent mediation algorithm to resolve domain collisions by selecting the highest-scoring domain as the authoritative resolution outcome.

12. The method of claim 1, further comprising:
utilizing an indexing database configured to store and continuously update domain data, wherein the domain data is derived from:
Blockchain Listeners and Indexers that monitor changes in web3 blockchain namespaces, top-level domains (TLDs), and associated metadata, including minting events, record edits, transfer events, and other blockchain-based affectations; and
DNS Root Listeners and Indexers that monitor changes in web2 DNS root zone files, TLDs, and associated metadata through periodic queries to global DNS systems;
implementing a set of independent processes running on one or more servers to:
query web3 blockchain smart contracts for namespace-specific domain records and metadata;
query web2 DNS root zone files for traditional domain records and metadata;
extract sub-elements from retrieved data;
transform the extracted data into structured metadata using enrichment scripts; and
load the transformed metadata into the indexing database for storage and future retrieval;
enabling bi-directional interaction between the indexing database and at least one of the following:
analytics modules configured to process historical usage patterns to refine conflict resolution algorithms;
profile administration interfaces allowing administrative users to configure preferences, overrides, and rules that affect scoring outcomes; and
intelligent mediation algorithms that retrieve domain records from the indexing database for iterative scoring computations; and
wherein the indexing database supports high-speed query execution for conflict resolution processes by maintaining structured metadata that includes domain ownership details, registration timestamps, abuse signals, resolution history, namespace-specific attributes, and enriched TLD properties.

* * * * *